(12) United States Patent
Crivello

(10) Patent No.: US 10,377,855 B2
(45) Date of Patent: Aug. 13, 2019

(54) OXETANE POLYMERS AND METHODS OF PREPARATION THEREOF

(71) Applicant: RENSSELAER POLYTECHNIC INSTITUTE, Troy, NY (US)

(72) Inventor: James V. Crivello

(73) Assignee: Rensselaer Polytechnic Institute, Troy, NY (US)

( * ) Notice: Subject to any disclaimer, the term of this patent is extended or adjusted under 35 U.S.C. 154(b) by 0 days.

(21) Appl. No.: 15/321,502

(22) PCT Filed: Jun. 25, 2015

(86) PCT No.: PCT/US2015/037806
§ 371 (c)(1),
(2) Date: Dec. 22, 2016

(87) PCT Pub. No.: WO2015/200706
PCT Pub. Date: Dec. 30, 2015

(65) Prior Publication Data
US 2017/0198093 A1 Jul. 13, 2017

Related U.S. Application Data

(60) Provisional application No. 62/016,799, filed on Jun. 25, 2014, provisional application No. 62/030,646, filed on Jul. 30, 2014.

(51) Int. Cl.
| | |
|---|---|
| *C08G 65/22* | (2006.01) |
| *C08G 65/18* | (2006.01) |
| *C08G 65/10* | (2006.01) |
| *C08G 65/26* | (2006.01) |
| *C08K 5/1515* | (2006.01) |
| *C08L 83/06* | (2006.01) |
| *C08G 77/14* | (2006.01) |

(52) U.S. Cl.
CPC .......... *C08G 65/22* (2013.01); *C08G 65/105* (2013.01); *C08G 65/18* (2013.01); *C08G 65/2603* (2013.01); *C08K 5/1515* (2013.01); *C08L 83/06* (2013.01); *C08G 77/14* (2013.01)

(58) Field of Classification Search
CPC ................................. C08G 65/18; C08G 65/22
See application file for complete search history.

(56) References Cited

U.S. PATENT DOCUMENTS

| | | | |
|---|---|---|---|
| 5,463,084 A | 10/1995 | Crivello et al. | |
| 5,478,920 A | 12/1995 | Drysdale | |
| 2003/0094738 A1* | 5/2003 | Maeda | C08G 59/68 264/494 |
| 2004/0228983 A1 | 11/2004 | Chien et al. | |
| 2006/0189715 A1* | 8/2006 | Ishibashi | C09D 11/101 523/160 |
| 2007/0078099 A1 | 4/2007 | McLaurin | |
| 2007/0115326 A1* | 5/2007 | Yokoi | B41C 1/1066 347/52 |
| 2012/0130007 A1 | 5/2012 | Jaunky et al. | |
| 2014/0216074 A1* | 8/2014 | Minor | C09K 5/045 62/77 |

FOREIGN PATENT DOCUMENTS

WO 2010077606 A1 7/2010

OTHER PUBLICATIONS

International Search Report and Written Opinion issued in PCT/US2015/037806, dated Sep. 30, 2015.
Crivello et al., "Synthesis and Photopolymerization of Silicon-Containing Multifunctional Oxetane Monomers," Journal of Macromolecular Science, Part A: Pure and Applied Chemistry, 30(2-3): 173-187 (1993).
Sasaki et al., "The Systhesis, Characterizatio, and Photoinitiated Cationic Polymerizaton of Difunctional Oxetanes," Journal of Macromolecular Science, Part A: Pure and applied Chemistry, 29(10): 915-930 (1992).
James V. Crivello, "Vinyl epoxide accelerators for the photoinitiated cationic polymerization of oxetane monomers," Polymer, 64:227-233 (2015).
James V. Crivello, "Investigations of the Reactivity of "Kick-Started" Oxetanes in Photoinitiated Cationic Polymerization," Journal of Polymer Science, Part A: Polymer Chemistry, 53:586-593 (2015).
James V. Crivello, "Hybrid Acrylate-Oxetane Photopolymerizable Systems," Journal of Polymer Science, Part A: Polymer Chemistry, 53:594-601 (2015).
James V. Crivello, "Kick-Starting" Oxetane Photopolymerizations, Journal of Polymer Science, Part A: Polymer Chemistry, 52:2934-2946 (2014).
James V. Crivello, "Redox Initiated Cationic Polymerization," Macromolecular Symposia, 323: 75-85 (2013).
Park et al., "Photoinitiated Cationic Polymerization of Limonene 1,2-Oxide and α-Pinene Oxide," Journal of Polymer Science, Part A: Polymer Chemistry, 51:109-117 (2013).
James V. Crivello, "UV and electron beam-induced cationic polymerization," Nuclear Instruments and Methods in Physics Research B, 151:8-21 (1999).
James V. Crivello, Supplemental (Extended) European Search Report for EP 15812200.2, dated Jan. 2, 2018 (6 pages).

* cited by examiner

*Primary Examiner* — Kuo Liang Peng
(74) *Attorney, Agent, or Firm* — Murtha Cullina LLP; Anthony P. Gangemi

(57) ABSTRACT

The invention is directed to processes for preparation of oxetane polymers, wherein an epoxide accelerant is reacted with one or more equivalents of a 3-monosubstituted oxetane or a 3,3-disubstituted oxetane, wherein the epoxide accelerant is selected from the group consisting of 2,2-substituted epoxide, 2,2,3-substituted epoxide, 2,2,3,3-substituted epoxide, and mixtures thereof. Also disclosed are oxetane polymers prepared by the processes of the invention.

8 Claims, 15 Drawing Sheets

OXETANE POLYMERS AND METHODS OF PREPARATION THEREOF

CROSS-REFERENCE TO RELATED APPLICATIONS

This application is a U.S. National Phase filing under 35 U.S.C. § 371 of International Application No. PCT/US2015/0307806, filed Jun. 25, 2015, and published as WO 2015/200706-A1 on Dec. 30, 2015, which claims the benefit of priority under 35 U.S.C. § 119(e) to U.S. Provisional Patent Application Ser. No. 62/016,799, filed on Jun. 25, 2014 and to U.S. Provisional Patent Application Ser. No. 62/030,646, filed on Jul. 30, 2014. The entire contents of each of the prior applications are incorporated herein by reference in their entirety.

FIELD OF THE INVENTION

The invention is directed to processes for preparation of oxetane polymers, wherein an epoxide accelerant is reacted with one or more (or two or more) equivalents of a 3-monosubstituted oxetane or a 3,3-disubstituted oxetane, wherein the epoxide accelerant is selected from the group consisting of 2,2-substituted epoxide, 2,2,3-substituted epoxide, 2,2,3,3-substituted epoxide, and mixtures thereof.

BACKGROUND OF THE INVENTION

Oxetanes are strained, reactive heterocyclic compounds that undergo facile cationic ring-opening polymerization and this topic has been the subject of two review articles (Saegusa, T. J. Macromol. Sci. Chem. 1972, 6, 997-1026; Penczek, S.; Kubisa, P.; Matyjaszewski, K. Adv. Polym. Sci. 1985, 68/69, 66-77). Some of the seminal studies of the cationic ring-opening polymerizations of these compounds were performed by Kops et al. (Kops, J.; Spanggaard, H. Cationic Polymerization and Related Processes, Goethals, E. J. editor, Academic Press, San Diego 1984, 227-236; Kops, J.; Hvilsted, S.; Spanggaard, H. Macromolecules 1982, 15, 1200-1201; Kops, J.; Spanggaard, H. Macromolecules 1982, 15, 1225-1231; Kops, J.; Spanggaard, H. Cationic Polymerization and Related Processes, Goethals, E. J. editor, Academic Press, 1984, 220-236), Dreyfus and Dreyfus (Dreyfus, P.; Dreyfus, M. P. Polym. J. 1976, 8, 81-87) and by Goethals et al. (Goethals, E. J. Adv. Polym. Sci. 1977, 23, 101; Bucquoye, M.; Goethals, E. J. Makromol. Chem. 1978, 179, 1681-1688). Oxetanes possess a high degree of ring strain (107 kJ/mol) that is only slightly less than epoxides (114 kJ/mol) (Pell, A. S.; Pilcher, G. Trans. Faraday Soc. 1965, 61, 71-77). On the other hand, oxetanes are considerably more basic (pKa=2.0) than epoxides (pKa=3.7) (Searles, S.; Tamres, M.; Lippincott, E. R. J. Am. Chem. Soc. 1953, 75, 2775-2778; Arnett, E. M.; Progress in Physical Organic Chemistry, Interscience, New York, 1967, 7, 243). These two factors offset one another and lead to the prediction that both classes of monomers should have similar reactivity in cationic ring-opening polymerizations. Despite this conclusion, until recently oxetanes have received comparatively little attention from both academic and industrial researchers while research publications on epoxide monomers, oligomers and resins abound.

This is slowly beginning to change due to several significant factors. At the present time, epoxide resins based on bisphenol-A and epichlorohydrin have received a great deal of negative press regarding ongoing health and worker safety concerns. Bisphenol-A has been reported to be an estrogen mimic (O'Connor, J. C.; Chapin R. E. Pure Appl. Chem. 2003, 75(11-12), 2099-2123; vom Saal, F. S.; Myers, J. P. J. Am. Med. Assoc. 2008, 300(11), 1353-5), while epichlorohydrin used in the synthesis of these resins is an orally and dermatologically active toxic agent (Lawrence, W. H.; Malik, M.; Turner, J. E.; Autian, J. J. Pharmaceut. Sci. 1972, 61, 1712-1717) as well as a human mutagen and carcinogen (IARC Monographs on the Evaluation of Carcinogenic Risks in Humans, Monograph 71, 1999, 603-628). The corresponding 3,3-disubstituted oxetane monomers do not have these drawbacks and, in general, have low orders of acute and chronic toxicity and are also non-mutagenic (Sasaki, H. Photoinitiated Cationic Polymerization, Chapter 26, Belfield, K. D.; Crivello, J. V., editors, ACS Symp. Ser. 847, Am. Chem. Soc., Washington, D.C. 2003, pp. 296-305). Oxetanes with substituents at the 2 and 4 positions undergo sluggish cationic ring-opening polymerizations, while those with substituents in the 3 position are considerably more reactive.

An additional factor that accounts for the relatively slow development of oxetane technology relative to the well-entrenched epoxide chemistry appears to have been the general lack of commercial availability of analogous 3,3-disubstituted oxetane monomers and oxetane functional oligomers. However, in recent years, the development of versatile and practical synthetic methods that afford mono-, di- and multifunctional 3,3-disubstituted oxetanes in high yields has made these monomers freely available from several commercial sources.

Two of the major synthetic routes for the synthesis of 3,3-disubstituted oxetanes are based on work originating from this laboratory and they are depicted in equations 1-4 (Sasaki, H.; Crivello, J. V. J. Macromol. Sci. Pure Appl. Chem. 1992, A29(10), 915-920. 19; Crivello, J. V.; Sasaki, H. J. Macromol. Sci. Pure Appl. Chem. 1993, A30(2&3), 189-206). In 1957, Pattison (Pattison, D. B. J. Am. Chem Soc. 1957, 79, 3455-3456) showed that 1,3-propane diols could be converted to oxetanes by reaction with diethylcarbonate in the presence of potassium carbonate. Applying this reaction to trimethylolpropane, 1, as shown in equation 1 affords the cyclic carbonate, 2, as an intermediate which on heating extrudes carbon dioxide to give 3-ethyl-3-hydroxymethyloxetane (EHMO). EHMO is a key intermediate for the synthesis of a wide variety of 3,3-disubstituted oxetane-containing monomers. For example, the reaction of EHMO with α,α'-dibromo-p-xylylene under basic reaction conditions in the presence of a phase transfer catalyst (PTC) gives difunctional oxetane monomer, XDO (equation 2).

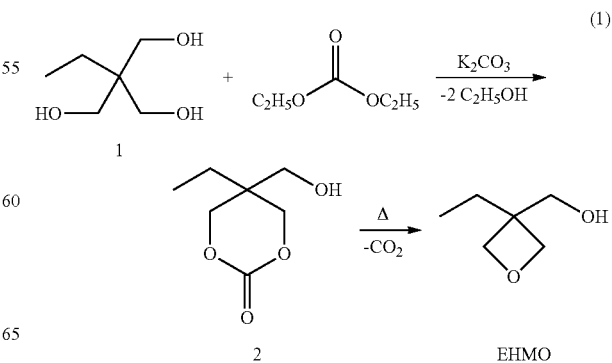

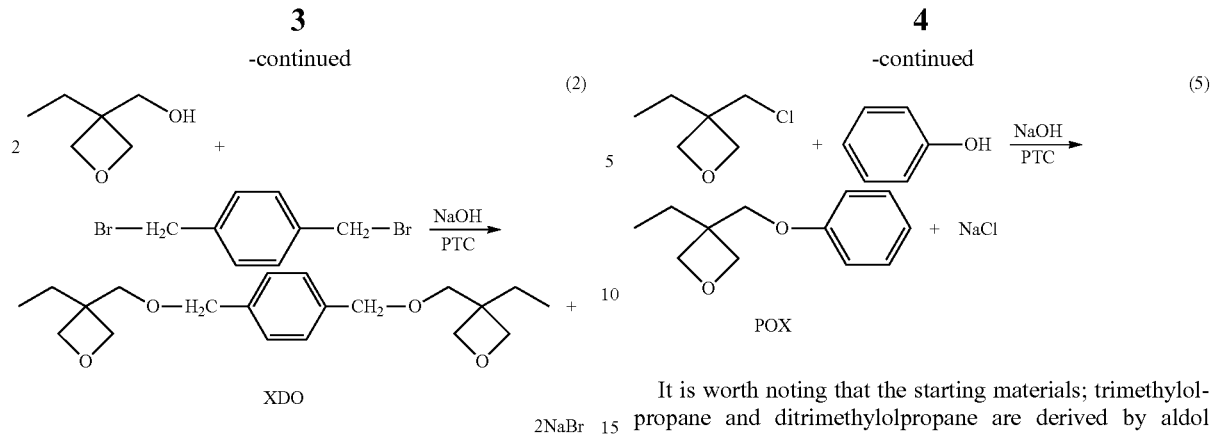

(2)

XDO

Applying the ring closure reaction shown in equation 1 to ditrimethylolpropane (bis[2,2-dihydroxymethyl)butyl] ether), 3, gives difunctional oxetane monomer DOX (equation 3).

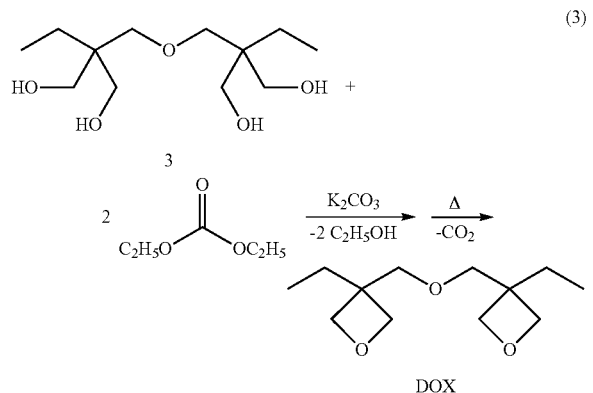

(3)

DOX

A third method involving a dehydrohalogenation reaction is shown in equation 4 (Hirose, T.; Ito, N. U.S. Pat. No. 5,886,199 A, Mar. 23, 1999 assigned to Toagosei, Co, Ltd. Japan). Trimethylolpropane is treated with gaseous HCl in a mixture of m-xylene and acetic acid to give 1,1-bis(chloromethyl)-1-hydroxymethylpropane, 4. After isolation, 4 is dehydrochlorinated with aqueous NaOH in the presence of a quaternary ammonium salt phase-transfer catalyst to give the desired 3-chloromethyl-3-ethyloxetane, 5. This latter compound also serves as an intermediate for the preparation of a number of mono- and multifunctional oxetanes. For example, 3-ethyl-3-phenoxymethyloxetane, POX, is prepared by an $S_N^2$ reaction of phenol with 5 in the presence of a base (equation 5).

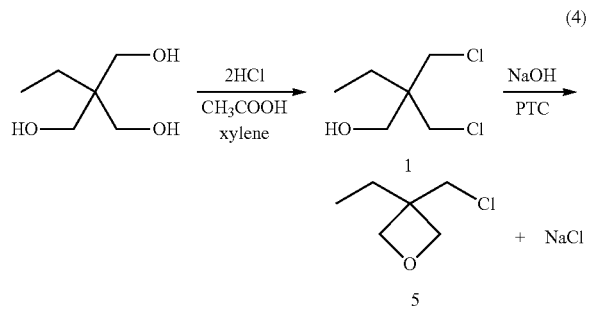

(4)

(5)

POX

It is worth noting that the starting materials; trimethylolpropane and ditrimethylolpropane are derived by aldol chemistry from low cost readily available and biorenewable butyraldehyde and formaldehyde. This favorable environmental aspect of oxetane chemistry provides an added attractive incentive for the further development of oxetane monomers and reactive oligomers.

In addition to the oxetane monomers prepared using the three synthetic methods described above, a number of other novel oxetanes have been synthesized such as; silicon-containing oxetanes (Crivello, J. V., Sasaki, H. J. Macromol. Sci., Pure and Appl. Chem. 1993, A30(2&3), 173-187; Sangermano, M.; Bongiovanni, R., Malucelli, G., Priola, A., Olbrych, J., Harden, A., Rehnberg, N. J. Polym. Sci., Part A: Polym. Chem. 2004, 42(6), 1415-1420; Moszner, N., Voelkel, t., Stein, S., Rheinberger, V. U.S. Pat. No. 6,096,903, Sep. 4, 2001, to Ivoclar, Ag.), oxetane-functionallized novolac resins (Nishikubo, T.; Kudo, H.; Nomura, H. Polym. J. 2008, 40, 310-316), oxetane-functional polymers for use in organic light emitting diodes (OLEDs) (Müller, C. D.; Falcou, A.; Reckefuss, N.; Rojahn, M.; Wiederhirn, V.; Rudati, P.; Frohne, H.; Nuyken, O.; Becker, H.; Meerholz, K. Nature, 2003, 421, 829-833) and oxetane esters (Nuyken, O.; B hner, R.; Erdmann, C.; Macromol. Symp. 1996, 107(1), 125-138). These efforts exemplify the great versatility of oxetane chemistry and illustrate the ease with which the oxetane group can be introduced into different substrates to produce polymerizable monomers, polymers and functional oligomers (Nishikubo, T.; Kudo, H. (2007). MRS Proceedings, 2007, 1005-Q02-04 doi:10.1557/PROC-1005-Q02-04).

The major interest of this laboratory in oxetane chemistry relates to their potential use as cationically photopolymerizable monomers and reactive oligomers in such applications as coatings, adhesives and printing inks. Two especially attractive future uses for photopolymerizable oxetanes are 3D imaging applications (sometimes termed "additive manufacturing") and dental composites. Presented in Scheme 1 is the mechanism that we have previously proposed for the photoinitiated cationic ring-opening polymerization of oxetanes using a diaryliodonium salt as the cationic photoinitiator (Crivello, J. V. Ring-Opening Polymerization, Chapter 5, Brunelle, D. J., editor, Hanser Pub., Munich, 1963, pp. 157-196). A very similar mechanism can be written for the photopolymerization of these monomers using triarylsulfonium salts as photoinitaitors. When onium salt photoinitiators are irradiated with UV light, they undergo very efficient photolysis to generate a number of reactive species that include radicals, cations and cation-radicals (equation 6). Further reaction of these species with water or other protonic species present in the reaction mixture results in the generation of the acid, $HMtX_n$, corresponding to the anion that accompanies the diarylidonium cation in the starting salt. Typically, the anion is selected such that a very strong protonic acid is generated which serves as the initiator (equation 7) for the subsequent polymerization (equations 8 and 9) of the oxetane monomer. The overall polymerization process is complex, involving three separate steps each with its own characteristic rate constant. From the results of our previous work (Bulut, U.; Crivello, J. V. J Polym Sci Part A: Polym Chem 2005, 43, 3205-3220; Crivello, J. V.; Bulut, U. Design. Mons. Polym. 2005, 8(6), 517-531), we suggest that the rate determining step in this reaction sequence is equation 8.

Scheme 1

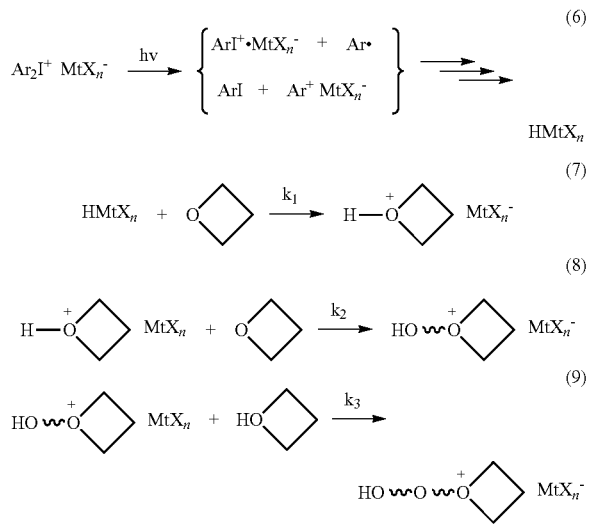

Despite the similarity of their ring-strains and steric hindrance considerations and the $S_N^2$ mechanisms of polymerization, oxetanes display a very sluggish response to onium salt-induced cationic photopolymerizations than their epoxide counterparts. Investigations have shown that this apparent sluggish polymerization behavior is manifested in the characteristically long induction periods. These results have been interpreted as due to a higher energy barrier for the ring-opening of the four membered oxetane ring than for the three membered epoxide group (Sasaki, H.; Rudzinski, J. M.; Kakuchi, T. J Polym Sci Part A: Polym Chem 1995, 33, 1807-1816; Kato, H.; Sasaki, H. Photoinitiated Cationic Polymerization, Chapter 25, Belfield, K. D.; Crivello, J. V. editors, ACS Symp. Ser. 847, Am. Chem. Soc., Washington, D.C. 2003, pp. 285-295). During the induction period, we have shown that photolysis of the photoinitiator takes place and that the photogenerated acid that is produced very rapidly protonates the oxetane monomer (Crivello, J. V.; Bulut, U. Design. Mon. and Polym. 2005, 8(6), 517-531; Crivello, J. V.; Falk, B.; Zonca, Jr. M. R. J. Polym. Sci., Part A: Polym. Chem. 2004, 42, 1630-1646). However, no substantial amount of polymerization takes place at room temperature until the acid concentration reaches a certain threshold required to support a thermally induced autoaccelerated polymerization. Often, this can be observed as a highly exothermic polymerization front that moves rapidly from one part of the sample to another within the irradiation zone. Additionally, the polymerization can be triggered by heating the sample at almost any time within the induction period.

Most importantly, the presence of an extended induction period in the photopolymerization of oxetane monomers is totally incompatible with the rapid response required for many of the high speed applications in which photoinitiated cationic polymerizations are employed. Ideally for such applications, the rate of a photopolymerization should be determined by the rate of the generation of the active species. This implies that in Scheme 1, equation 1 should be the rate determining step. Consderable efforts have been expended in attempts to minimize the induction periods of oxetane monomers or to eliminate them entirely. Most of the investigations in this area have centered about the copolymerizations of oxetanes with epoxide monomers and especially with the commercially available cycloaliphatic diepoxide, 3,4-epoxycyclohexylmethyl 3',4'-epoxycyclohexanecarboxylate (ERL) (Sasaki, H.; Rudzinski, J. M.; Kakuchi, T. J Polym Sci Part A: Polym Chem 1995, 33, 1807-1816; Sasaki, H. Toagosei, Co. Ltd. Web publication, www2.toagosei.cajp/develop/trend/No4/oxetanes.pdf; Sangermano, M.; Malucelli, G.; Bongiovanni, R. Eur. Polym. J. 2004, 40(2), 353-358; Sasaki, H.; Kuriyama, A. Proc. RadTech Asia Radiation Curing Conference, Kuala Lumpur, Malaysia, Aug. 26-24, 1999, 263-268). However, previous work in this laboratory (Crivello, J. V.; Varlemann, U. J. Polym. Sci., Part A: Polym. Chem. 1995, 33(14), 2463-2471), demonstrated that this latter diepoxide undergoes comparatively slow cationic photopolymerizations in the presence of onium salt photoinitiators. Present disclosure provides a new approach towards enhancing the reactivity of oxetane monomers and functional oligomers that is both highly effective and general in its scope.

SUMMARY OF THE INVENTION

The invention is directed to processes for preparation of oxetane polymers. The disclosed processes comprise reacting an epoxide accelerant with one or more (or two or more) equivalents of a 3-monosubstituted oxetane or a 3,3-disubstituted oxetane, wherein the epoxide accelerant is selected from the group consisting of 2,2-substituted epoxide, 2,2,3-substituted epoxide, 2,2,3,3-substituted epoxide, and mixtures thereof.

The reacting of the epoxide accelerant with one or more (or two or more) equivalents of a mono-substituted oxetane or a di-substituted oxetane may be performed under conditions of a photopolymerization reaction, which conditions would be known to a person having ordinary skill in the art. The reacting of the epoxide accelerant with one or more (or two or more) equivalents of a mono-substituted oxetane or a di-substituted oxetane may also be performed under conditions of a thermally induced polymerization reaction, an electron-beam polymerization reaction, or a redox-triggered polymerization reaction, which conditions would be known to a person having ordinary skill in the art.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
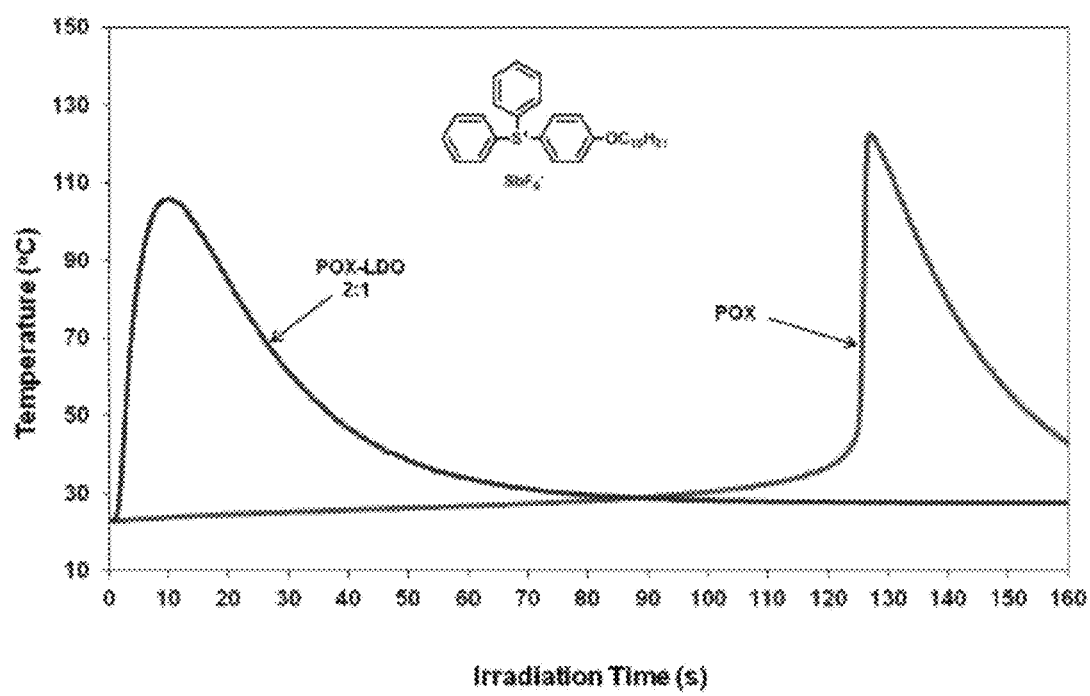
FIG. 1. OP (optical pyrometry) study of the photopolymerization of POX in the presence and absence of LDO with 4 wt % SOC-10 SbF$_6$ as the photoinitiator. (light intensity 1610 mJ cm$^{-2}$ min$^{-1}$).

In the following specification and the claims which follow, reference will be made to a number of terms, which shall be defined to have the following meanings.

The singular forms "a", "an", and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about", is not to be limited to the precise value specified. In some instances, the approximating language may correspond to the precision of an instrument for measuring the value.

Unless otherwise specified, "alkyl" is intended to include linear, branched, or cyclic hydrocarbon structures and combinations thereof. A combination would be, for example, cyclopropylmethyl. As used herein, the term "alkyl" encompasses lower alkyls, which are alkyl groups of from 1 to 6 carbon atoms. Examples of lower alkyl groups include methyl, ethyl, propyl, isopropyl, butyl, s- and t-butyl and the like. As used herein, the term "alkyl" also encompasses alkyls having from 1 to 18 carbon atoms. Cycloalkyl is a subset of alkyl and includes cyclic hydrocarbon groups of from 3 to 8 carbon atoms. Examples of cycloalkyl groups include c-propyl, c-butyl, c-pentyl, norbornyl and the like.

The term "alkenyl" refers to an alkyl having at least one double bond. The term "alkeynyl" refers to an alkyl having at least one triple bond.

The term "heteroalkyl" refers to alkyls in which from one to four carbons is replaced by a heteroatom selected from the group consisting of N, O and S. The nitrogen and sulfur heteroatoms may optionally be oxidized, and the nitrogen heteroatom may optionally be quaternized.

The term "heteroalkenyl" refers to alkenyls in which from one to four carbons is replaced by a heteroatom selected from the group consisting of N, O and S. The nitrogen and sulfur heteroatoms may optionally be oxidized, and the nitrogen heteroatom may optionally be quaternized.

The term "heteroalkynyl" refers to alkynyls in which from one to four carbons is replaced by a heteroatom selected from the group consisting of N, O and S. The nitrogen and sulfur heteroatoms may optionally be oxidized, and the nitrogen heteroatom may optionally be quaternized.

Unless otherwise specified, the term "carbocycle" is intended to include ring systems in which the ring atoms are all carbon but of any oxidation state. Thus ($C_3$-$C_{10}$) carbocycle refers to both non-aromatic and aromatic systems, including such systems as cyclopropane, benzene and cyclohexene; ($C_8$-$C_{12}$) carbopolycycle refers to such systems as norbornane, decalin, indane and naphthalene. Carbocycle, if not otherwise limited, refers to monocycles, bicycles and polycycles.

The term "heterocycle" means a cycloalkyl or aryl carbocycle residue in which from one to four carbons is replaced by a heteroatom selected from the group consisting of N, O and S. The nitrogen and sulfur heteroatoms may optionally be oxidized, and the nitrogen heteroatom may optionally be quaternized. Unless otherwise specified, a heterocycle may be non-aromatic or aromatic. Examples of heterocycles that fall within the scope of the invention include pyrrolidine, pyrazole, pyrrole, indole, quinoline, isoquinoline, tetrahydroisoquinoline, benzofuran, benzodioxan, benzodioxole (commonly referred to as methylenedioxyphenyl, when occurring as a substituent), tetrazole, morpholine, thiazole, pyridine, pyridazine, pyrimidine, thiophene, furan, oxazole, oxazoline, isoxazole, dioxane, tetrahydrofuran and the like. It is to be noted that heteroaryl is a subset of heterocycle in which the heterocycle is aromatic. Examples of heterocyclyl residues additionally include piperazinyl, 2-oxopiperazinyl, 2-oxopiperidinyl, 2-oxo-pyrrolidinyl, 2-oxoazepinyl, azepinyl, 4-piperidinyl, pyrazolidinyl, imidazolyl, imidazolinyl, imidazolidinyl, pyrazinyl, oxazolidinyl, isoxazolidinyl, thiazolidinyl, isothiazolyl, quinuclidinyl, isothiazolidinyl, benzimidazolyl, thiadiazolyl, benzopyranyl, benzothiazolyl, tetrahydrofuryl, tetrahydropyranyl, thienyl, benzothienyl, thiamorpholinyl, thiamorpholinylsulfoxide, thiamorpholinylsulfone, oxadiazolyl, triazolyl and tetrahydroquinolinyl.

"Alkoxy" or "alkoxyl" refers to groups of from 1 to 8 carbon atoms of a straight, branched or cyclic configuration and combinations thereof attached to the parent structure through an oxygen. Examples include methoxy, ethoxy, propoxy, isopropoxy, cyclopropyloxy, cyclohexyloxy and the like. Lower-alkoxy refers to groups containing one to four carbons. For the purpose of this application, alkoxy and lower alkoxy include methylenedioxy and ethylenedioxy.

Oxaalkyl refers to alkyl residues in which one or more carbons (and their associated hydrogens) have been replaced by oxygen. Examples include methoxypropoxy, 3,6,9-trioxadecyl and the like. The term oxaalkyl is intended as it is understood in the art [see Naming and Indexing of Chemical Substances for Chemical Abstracts, published by the American Chemical Society, 196, but without the restriction of 127(a)], i.e. it refers to compounds in which the oxygen is bonded via a single bond to its adjacent atoms (forming ether bonds); it does not refer to doubly bonded oxygen, as would be found in carbonyl groups. Similarly, thiaalkyl and azaalkyl refer to alkyl residues in which one or more carbons has been replaced by sulfur or nitrogen, respectively. Examples include ethylaminoethyl and methylthiopropyl.

Unless otherwise specified, acyl refers to formyl and to groups of 1, 2, 3, 4, 5, 6, 7 and 8 carbon atoms of a straight, branched, cyclic configuration, saturated, unsaturated and aromatic and combinations thereof, attached to the parent structure through a carbonyl functionality. One or more carbons in the acyl residue may be replaced by nitrogen, oxygen or sulfur as long as the point of attachment to the parent remains at the carbonyl. Examples include acetyl, benzoyl, propionyl, isobutyryl, t-butoxycarbonyl, benzyloxycarbonyl and the like. Lower-acyl refers to groups containing one to four carbons. The double bonded oxygen, when referred to as a substituent itself is called "oxo".

"Aryl" and "heteroaryl" mean (i) a phenyl group (or benzene) or a monocyclic 5- or 6-membered heteroaromatic ring containing 0-4 heteroatoms selected from O, N, or S; (ii) a bicyclic 9- or 10-membered aromatic or heteroaromatic ring system containing 0-4 heteroatoms selected from O, N, or S; or (iii) a tricyclic 13- or 14-membered aromatic or heteroaromatic ring system containing 0-5 heteroatoms selected from O, N, or S. The aromatic 6- to 14-membered carbocyclic rings include, e.g., benzene, naphthalene, indane, tetralin, and fluorene and the 5- to 10-membered aromatic heterocyclic rings include, e.g., imidazole, pyridine, indole, thiophene, benzopyranone, thiazole, furan, benzimidazole, quinoline, isoquinoline, quinoxaline, pyrimidine, pyrazine, tetrazole and pyrazole. As used herein aryl and heteroaryl refer to residues in which one or more rings are aromatic, but not all need be.

The term "halogen" means fluorine, chlorine, bromine or iodine. In one embodiment, halogen may be fluorine or chlorine.

The term "oxo", when referred to as a substituent, refers to a double bonded oxygen substituent.

The term "epoxy", when referred to as a substituent, refers to an oxygen atom bonded to two adjacent carbon atoms of the structure bearing this substituent.

The term "hydroxy alkyl" refers to an alkyl substituted with hydroxy group (i.e., —OH).

The term "epoxy alkyl" refers to alkyl substituted by epoxy substituent.

Reference to integers "n", "c", and "b" refers to the following exemplary integers: from 1 to 50; from 1 to 40; from 1 to 32; from 1 to 30, from 1 to 25; from 1 to 20; from 1 to 10; from 1 to 5; from 2 to 50; from 2 to 40; from 2 to 32; from 2 to 30, from 2 to 25; from 2 to 20; from 2 to 10; and from 2 to 5.

Reference to integers "k", "t", "h", "f", "m", and "p" refers to the following exemplary integers: from 1 to 1000; from 1 to 500; from 1 to 100; from 1 to 50; from 1 to 40: from 1 to 30: from 1 to 20; from 1 to 10; and from 1 to 5.

As used herein, the term "optionally substituted" may be used interchangeably with "unsubstituted or substituted".

Substituents R″ are generally defined when introduced and retain that definition throughout the specification and in all independent claims.

As used herein, and as would be understood by the person of skill in the art, the recitation of "a compound"—unless expressly further limited—is intended to include salts, solvates and inclusion complexes of that compound. Thus, for example, the recitation "a compound of formula I" as depicted above, in which $R^5$ is COOH, would include salts in which $R^5$ is COO$^-$ M$^+$, wherein M is any counterion. In a particular embodiment, the term "compound of formula I" refers to the compound or a pharmaceutically acceptable salt thereof. Unless otherwise stated or depicted, structures depicted herein are also meant to include all stereoisomeric (e.g., enantiomeric, diastereomeric, and cis-trans isomeric) forms of the structure; for example, the R and S configurations for each asymmetric center, (Z) and (E) double bond isomers, and (Z) and (E) conformational isomers. Therefore, single stereochemical isomers as well as enantiomeric, diastereomeric, and cis-trans isomeric (or conformational) mixtures of the present compounds are within the scope of the invention. Unless otherwise stated, all tautomeric forms of the compounds of the invention are within the scope of the invention. Additionally, unless otherwise stated, structures depicted herein are also meant to include compounds that differ only in the presence of one or more isotopically enriched atoms. For example, compounds having the present structures except for the replacement of hydrogen by deuterium or tritium, or the replacement of a carbon by a $^{13}$C- or $^{14}$C-enriched carbon are within the scope of this invention. Such compounds are useful, for example, as analytical tools or probes in biological assays.

As used herein, the term "-cyclyl-alkyl-cyclyl-" refers to a linking group, for example, as in R-cyclyl-alkyl-cyclyl-R.

As used herein, the term "-heterocyclyl-alkyl-heterocyclyl-" refers to a linking group, for example, as in R-heterocyclyl-alkyl-heterocyclyl-R.

As used herein, the term "-alkyl-cyclyl-" refers to a linking group, for example, as in R-alkyl-cyclyl-R or in R-cyclyl-alkyl-R.

Recent investigations in this laboratory have centered about the development of photopolymerizable epoxy monomers derived from biorenewable sources. Among the several classes of potentially interesting monomers are terpene epoxides. Of particular interest is the monoterpene diepoxide, limonene dioxide (LDO). LDO is prepared by the epoxidation of limonene using peracetic acid. Since limonene is obtained from the steam distillation of waste citrus peels, LDO is potentially a readily available and inexpensive diepoxide. Moreover, LDO is aliphatic and therefore, transparent at wavelengths from 200-700 nm making it ideal for UV induced photopolymerizations. Unfortunately, studies in this laboratory have demonstrated that while extraordinarily reactive, the photoinitiated cationic polymerization of LDO is remarkably inefficient. Although LDO is a difunctional epoxide, the cationic photopolymerization of this monomer using onium salt photoinitiators does not yield the expected crosslinked products.

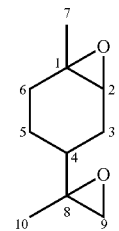

limonene dioxide, C$_{10}$H$_{16}$O$_2$

Examination of the structure of LDO reveals that each of the two epoxide groups present in the molecule are unique with respect to their reactivity due to differences in the steric and electronic environments in which they are located. The 1,2-epoxy group bears three alkyl substituents that would tend to enhance its susceptibility towards protonation, however, at the same time, these substituents greatly increase the steric hindrance at this site.

Similarly, the 8,9-epoxide group bears two bulky substituents on one of the carbons of the oxirane ring and is, consequently, less sterically hindered than the 1,2-epoxide group in the same molecule. For these reasons, the cationic ring-opening homopolymerization of the 1,2-epoxy group of LDO is very inefficient, while polymerization of the 8,9-epoxide group is considerably more favorable. Further complicating this situation is the occurrence of side reactions at both sites. As shown in equation 10, protonation of the 1,2-epoxide of LDO results in ring-opening to give the tertiary carbocation, 6, that can rearrange via oxycarbocation 7 to give ketone 8. A similar process can take place with the 8,9-epoxide group to give an aldehyde. These rearrangements are very well known to take place with many different 2,2,3-trialkyl-substituted epoxides and 2,2-dialkyl-substituted epoxides from the work of Olah et al. (Surya Prakash, G. K.; Mathew, T.; Krishmaraj, S.; Marinez, E. R.; Olah, G. A. Appl. Catal. A: General, 1999, 181, 283-288).

protonation of 2,2,3-trialkyl epoxides and 2,2-dialkyl-substituted epoxides should exhibit appreciable carbocationic character. Indeed, this conclusion has been verified by the work of Puskas et al. (Song, J.; Bódis, J.; Puskas, J. E. J. Polym. Sci. Part A: Polym. Chem., 2002, 40, 1005-1015; Puskas, J. E.; Brister, L. B.; Michel, A. J.; Lanzendörfer, M. G.; Jamieson, D.; Pattern, W. G., J. Polym. Sci. Part A: Polym. Chem. 2000, 38, 444-452; Puskas, J. E.; Chen, Y.; Tomkins, M. Eur. Polym. J. 2003, 39, 2147-2153; Puskas, J. E.; Michel, A. J. Macromol. Symp. 2000, 161, 141-148) who showed that in the presence of Lewis acids, these epoxides serve as initiators for the carbocationic polymerization of isobutylene. Using similar reasoning, we predicted that in the presence of strong photogenerated acids, LDO should protonate to form species such as 6 and that these carbocations would be expected to rapidly alkylate the relatively sterically unhindered 3,3-disubstituted oxetanes by a $S_N^1$ mechanism to initiate rapid ring-opening polymerizations. Equation 11 depicts this reaction in which only the 1,2-epoxide of LDO is represented for the sake of clarity.

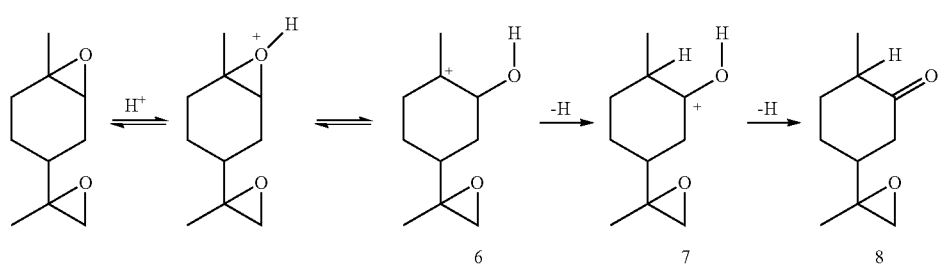

(10)

Based on mechanism shown in equation 10, it was predicted that stabilized intermediates such as 6 generated from the

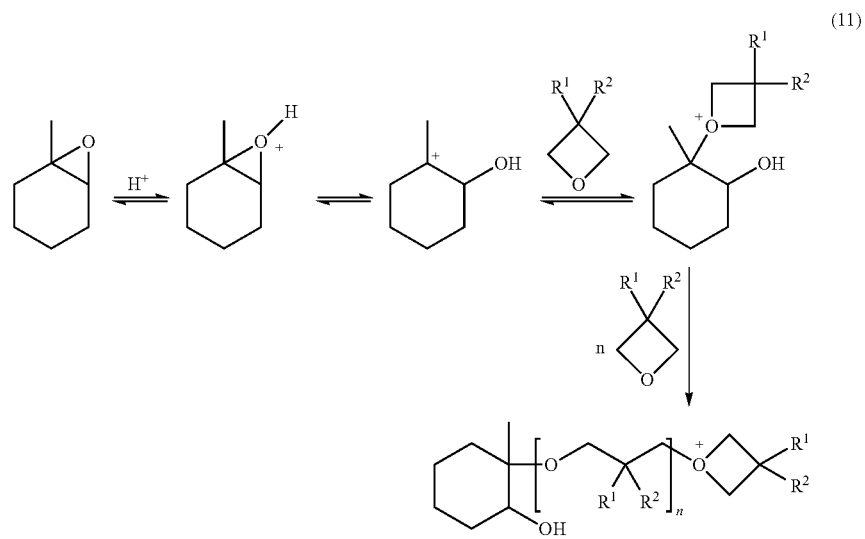

(11)

Based on this analysis, the photopolymerization of the oxetane monomer, POX, (3-ethyl-3-phenoxymethyloxetane) was carried out in the presence and absence of LDO (2:1 molar mixture of POX and LDO) and the progress of the photopolymerization followed by optical pyrometry (OP). OP has been shown to be a rapid, accurate and reproducible method for monitoring the progress of free radical and cationic photopolymerizations in real-time (Falk, B.; Vallinas, S. M; Crivello, J. V. J. Polym. Sci., Part A: Polym. Chem. 2003, 41(4), 579-596; Falk, B.; Vallinas, S. M; Crivello, J. V. Polym. Mat. Sci. Eng. Prepr. 2003, 89, 279-280). The initial slope of the time versus temperature OP plot gives a visible assessment of the rate of a photopolymerization and the maximum in the curve directly relates to the overall exothermicity of the polymerization taking place. Of particular interest in these studies is the length of the induction period before the aforementioned polymerization process sets in. The highly soluble triarylsulfonium salt, S(4-decyloxyphenyl)-S,S-diphenylsulfonium hexafluoroantimonate (abbreviated SOC-10 SbF$_6$), was used as the photoinitiator in most cases. As shown in FIG. 1, there is a dramatic difference in the induction periods of the two photopolymerizations. The photopolymerization of POX displays a long induction period (~125 sec). In contrast, the OP trace of the 2:1 molar mixture of POX and LDO proceeds almost instantaneously when the shutter is opened. A slight, ~1 second delay is always observed due to the configuration of the sample and results from the time required for the heat of the sample to pass through and reach the surface of the cover film. When the cover film is removed, this delay time is essentially eliminated.

We have termed the effect of LDO on the oxetane monomer "kick-starting" since it results in a very rapid, virtually induction period-free photopolymerization. "Kick-started" photopolymerizations provide systems that have inherently high light sensitivities that are essential for use in imaging applications as well as for the high speed UV cure of thin film coatings. As will be described in this communication, the "kick-starting" effect observed with LDO on oxetane monomers is a general phenomenon that may be applied to many different types of oxetane monomers using 2,2-di- and 2,2,3-trialkyl substituted epoxides as accelerators.

Figure 2:
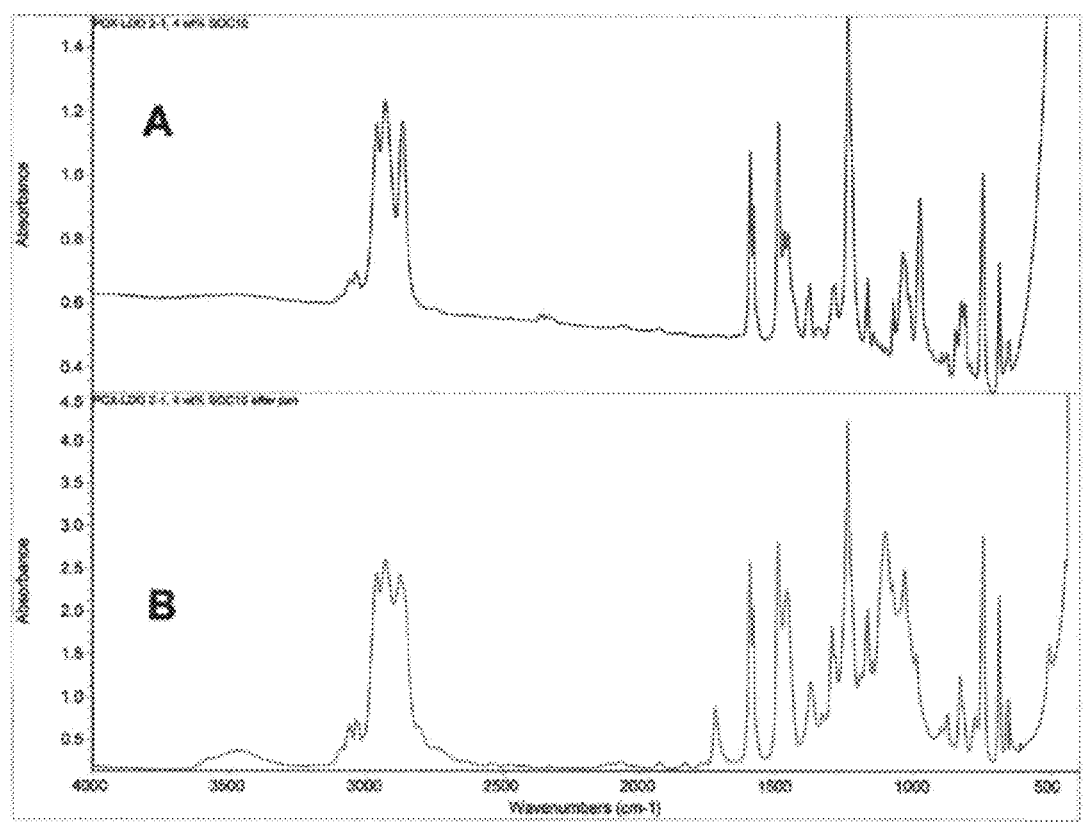
FIG. 2. OP study of a 2:1 mixture of POX and LDO with 4 wt % SOC-10 SbF$_6$ before and after photopolymerization. (irradiation carried out at 1610 mJ cm$^{-2}$ sec$^{-1}$ for three minutes)

An FT-IR spectral analysis of the photopolymerization of 2:1 molar mixture of POX and LDO is shown in FIG. 2. Prior to UV irradiation, POX does not display a band at 1723 cm−1, nor is there a band at this wavelength in the 2:1 molar mixture of POX and LDO as may be noted in spectrum A of this figure. After photopolymerization (spectrum B), several conspicuous changes take place; including the appearance of a small OH band after polymerization and a ketone peak at 1723 cm$^{-1}$. The hydroxyl absorption results from the ring-opening addition of the protonic acid to the epoxide and oxetane groups while the appearance of the band at 1723 cm$^{-1}$ indicates that ketone formation (equation 10) is not completely suppressed by the presence of the oxetane monomer. The polymer film formed after irradiation is solid, clear and colorless. It swells but does not dissolve in ethyl acetate indicating that some crosslinking has taken place.

Figure 3:
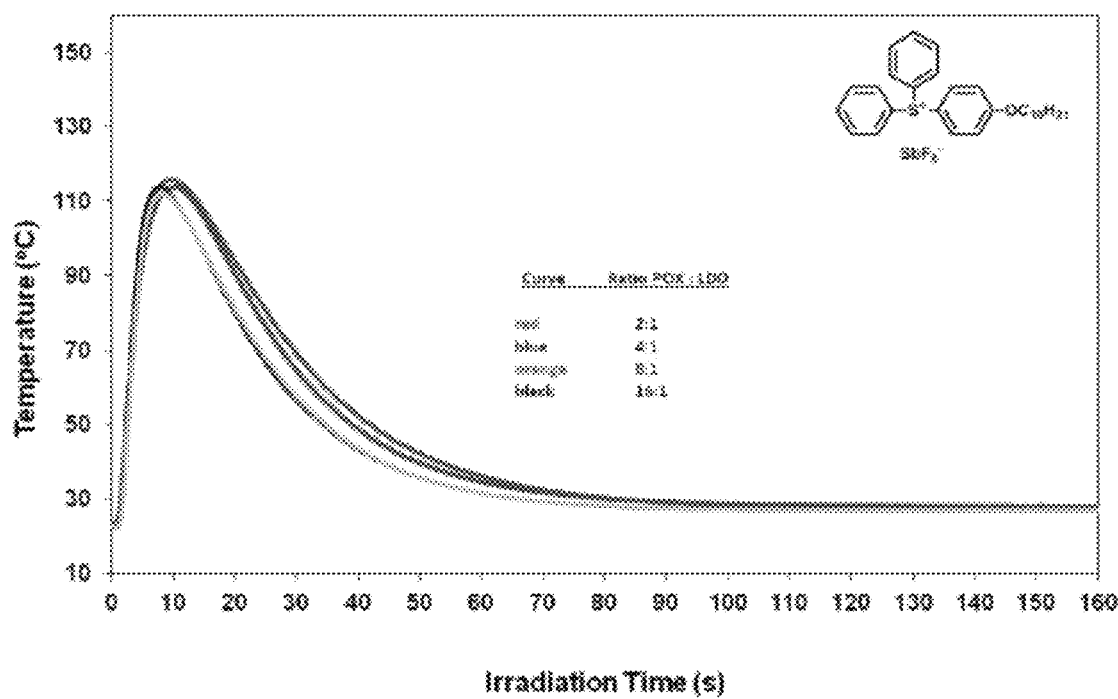
FIG. 3. OP study of the effect of the concentration of LDO on the photopolymerization of POX in the presence 4 wt % SOC-10 SbF$_6$ as the photoinitiator. (light intensity 1640 mJ cm$^{-2}$ min$^{-1}$).

A study of the effects of the LDO concentration on the photopolymerization of POX was carried out and the results are shown in FIG. 3. The molar ratios of POX with LDO ranged from 2:1 to 16:1 while maintaining the SOC-10 SbF$_6$ concentration at 4.0 wt %. On a weight % basis, the range of LDO in the samples is from 5.2 to 30%. Surprisingly, the results show that even at the lowest concentration, LDO is highly effective in reducing the induction period of the photopolymerization of POX. All the curves are nearly superimposable and this would tend to argue for participation of LDO primarily in the initiation step rather than be simply ascribed to fast copolymerization kinetics.

Figure 4:
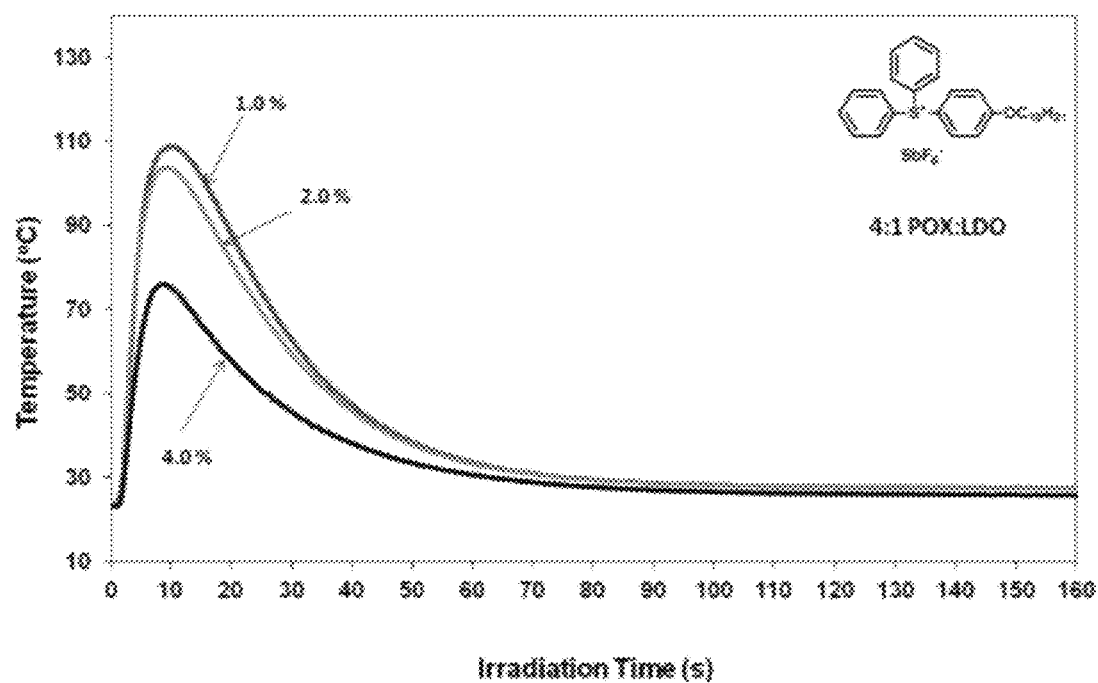
FIG. 4. Effect of the concentration of SOC-10 SbF$_6$ on the photopolymerization of a 4:1 molar mixture of POX and LDO (light intensity 1640 mJ cm$^{-2}$ min$^{-1}$)

The results of a study of the effects of the SOC-10 SbF$_6$ photoinitiator concentration on the photopolymerization of a 4:1 molar ratio of POX to LDO are given in FIG. 4. It is interesting to note that the sample containing lowest (1.3 wt %) photoinitiator concentration displayed the highest maximum temperature response as noted in the OP traces. However, it can be noted that at all three photoinitiator concentrations, the initial portions of the OP curves are very similar. These results again confirm the very high reactivity of this "kick started" monomer system.

Figure 5:
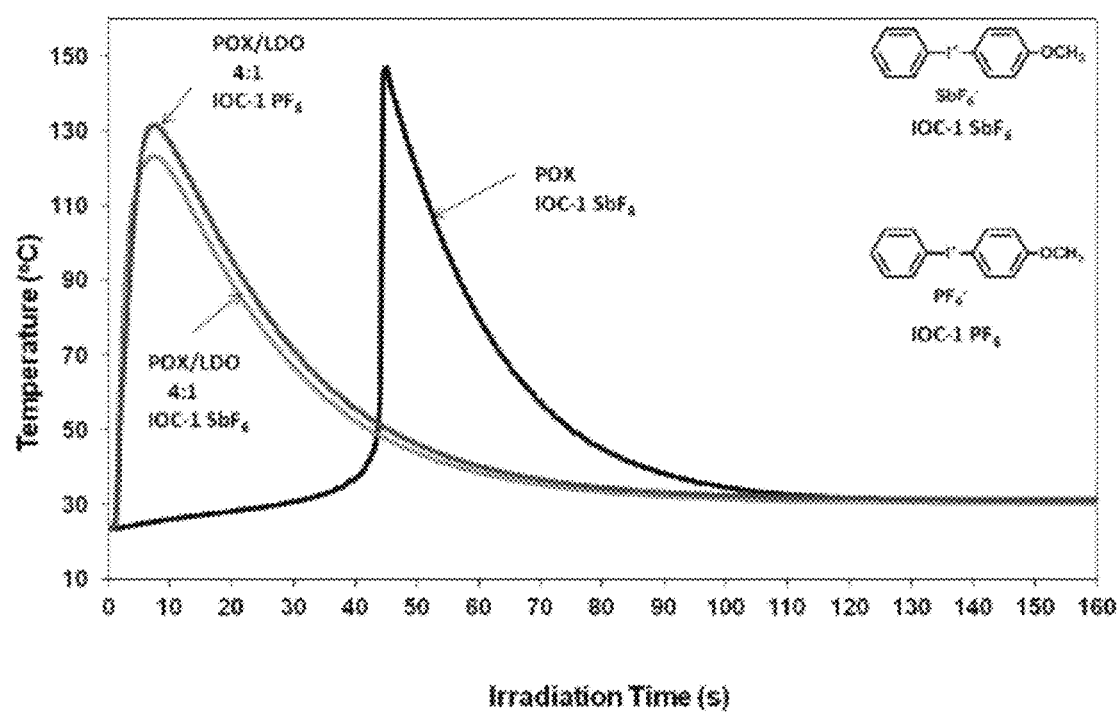
FIG. 5. Study of the photopolymerization of a 4:1 molar mixture of POX and LDO using (2.5 mol %) IOC-1 SbF$_6$— or 0.028 g IOC-1 PF$_6$—as photoinitiators. (light intensity 1515 mJ cm$^{-2}$ min$^{-1}$)

Employing POX as a model oxetane monomer and LDO as the accelerator, the effects of the replacement of the triarylsulfonium salt photoinitiator with 2.5 mol % of the analogous (4-methoxyphenyl)phenyliodonium salt photoinitiators bearing both SbF6- and PF6-anions (respectively designated IOC-1 SbF$_6$ and IOC-1 PF$_6$) were examined. The results of the OP study are given in FIG. 5. Also included in this figure for comparison is an OP curve for the photopolymerization of POX alone carried out using 2.5 mol % of IOC-1 SbF$_6$ as the photoinitiator.

The POX sample with IOC-1 SbF$_6$ displays the usual extended induction period, while the two samples containing LDO show extraordinarily high rates of photopolymerization with essentially no induction period. Both of these samples were nearly equal in their photoresponse and independent of the anion present in the iodonium salt. Again, this is the consequence of the very high reactivity of this mixed oxetane-epoxide monomer system.

Earlier in this disclosure, the rapid acceleration of the photopolymerization of POX by LDO was attributed to carbocations generated by the protonation of the 1,2- and possibly also the 8,9-epoxy groups of LDO by photogenerated Brönsted acids. This suggested that 1,2-limonene oxide (LMO) and α-pinene oxide (PO) should also exhibit similar accelerating effects.

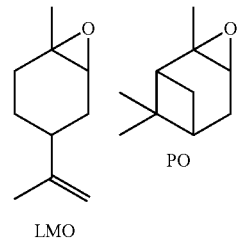

Figure 6:
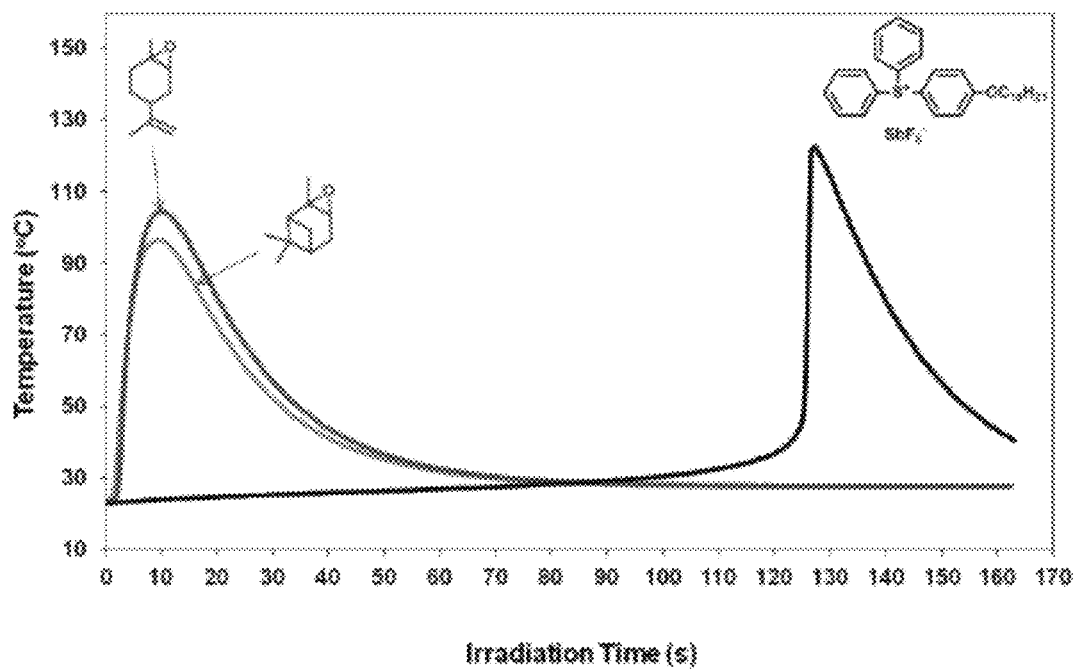
FIG. 6. Photopolymerization of an 8:1 molar ratio of POX and LMO with 4.0 wt % SOC-10 SbF$_6$ as the photoinitiator at a light intensity of 1515 mJ cm$^{-2}$ min$^{-1}$)

Accordingly, photopolymerizations were conducted using 8:1 molar mixtures of POX with either LMO and PO and the results are depicted in FIG. 6. Included in this figure is a baseline curve for the photopolymerization of POX omitting the epoxide accelerant. The results clearly show that at 9 wt %, both of these two isomeric epoxides are very effective accelerators for the photoinitiated cationic polymerization of POX. LMO appears to be a slightly better accelerator than PO, probably due to less steric hindrance about the reaction site. Previously (Park, H. J.; Ryu, C. Y.; Crivello, J. V.; J. Polym. Sci., Part A: Polym. Chem. 2013, 51, 109-117), we had reported that 30 wt % of PO can be used to accelerate the photopolymerization of DOX, but failed to recognize the significance, scope and magnitude of the acceleration effect.

PO is readily derived by the epoxidation of α-pinene which is one of the main constituents of turpentine. For this reason, like LDO and LMO, PO can be regarded as a sustainable biosourced, monomer. Further, PO is colorless, high boiling (102-103° C./50 mm Hg) and has a very low viscosity which makes it highly attractive as both an accelerator and a reactive diluent.

Figure 7:
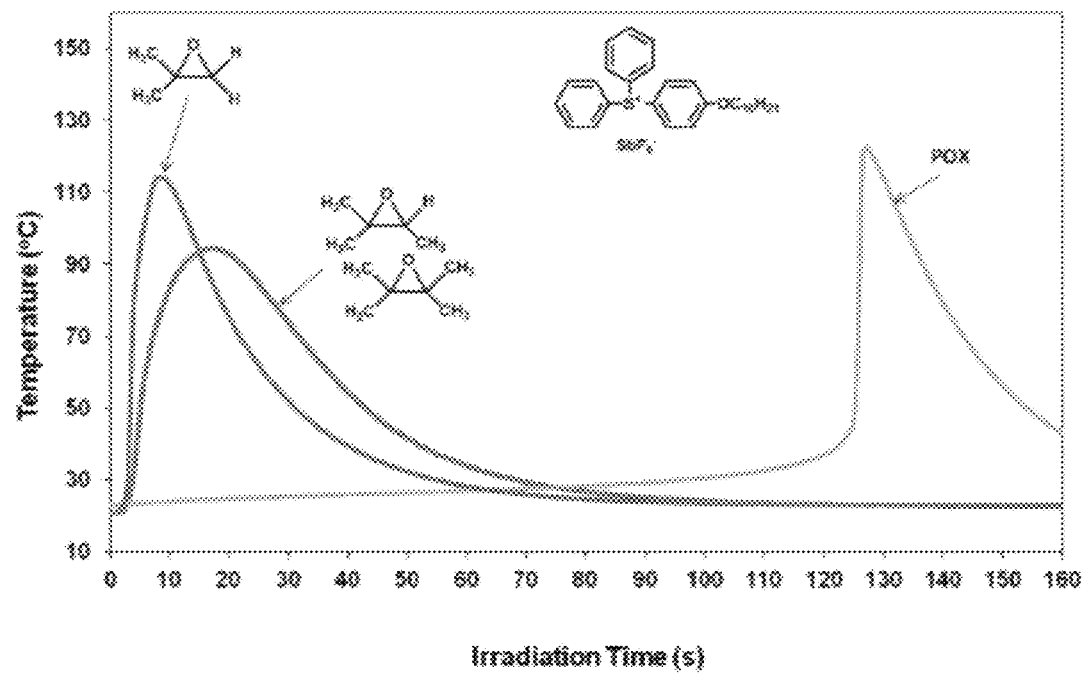
FIG. 7. Comparison of the photopolymerizations of POX and 4:1 molar mixtures of POX with 2,3-dimethyl-2,3-epoxybutane, 2,-methyl-2,3-epoxybutane and with 2-methyl-2,3-epoxypropane using 4.0 wt % SOC-10 SbF$_6$ at a light intensity of 1370 mJ cm$^{-2}$ min$^{-1}$.

Pursuing the concept that on protonation, 2,2,3-trialkylepoxides and 2,2-dialkylepoxides generate reactive cationic species, three additional model compound studies were carried out. Accordingly, the ability of 2-methyl-2,3-epoxybutane, 9, 2-methyl-2,3-epoxypropane, 10, and 2,3-dimethyl-2,3-epoxybutane (2,2,3,3-tetramethyloxirane), 11, to accelerate the photoinitiated cationic polymerization of POX was evaluated and the results are shown in FIG. 7. Both 9 and 10 are close analogues, respectively, of the 1,2- and 8,9-epoxy groups of LDO while it is expected that 11 would undergo facile protonation that would lead to the same tertiary carbocation as formed from epoxides 9 and 10. Moreover, there appears to be no published report of either the cationic ring-opening homopolymerization of 11 or its copolymerization. In all three instances, 4:1 molar mixtures of POX with the three epoxide model compounds were polymerized using 4.0 wt % of SOC-10 $SbF_6$. A baseline OP curve for POX alone is included in FIG. 7 for comparison. Epoxides 9-11 were excellent accelerators for the photopolymerization of POX. The OP traces for epoxides 9 and 11 exactly overlay one another. Based on these results, it may be concluded that both 1,2- and 8,9-epoxy groups of LDO participate in the fast initiation of the ring-opening polymerization of POX providing a unique dual acceleration of the photopolymerizations oxetane monomers.

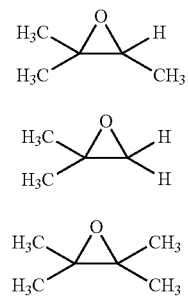

A wide variety of naturally-occurring terpenes contain double bonds that undergo facile stoichiometric or catalytic epoxidation to afford 2,2,3,3-tetraalkyl, 2,2,3-trialkyl- or 2,2-dialkyl-substituted epoxides. A review article that thoroughly summarizes progress in this area in period from 1988-2008 has been published by Bakhvalov et al. (Bakhvalov, O. V.; Fomenko, V. V.: Salakhutdinov, N. V. Chemistry for Sust. Dev. 2008, 16, 633-691). In addition to limonene and α-pinene, some other readily available terpenes are: 3-carene, camphene and caryophyllene. Epoxidation of these three terpenes yields the corresponding terpene epoxides 12, 13 and 14. Monoterpene epoxides, 12 and 13 (mixtures of isomers) were observed to be potent accelerators for the photoinitiated cationic ring-opening polymerization of oxetane monomers. For example, the photoinitiated polymerizations of 8:1 molar mixtures of POX with 12 or 13 together with 4.0 wt % of SOC-10 $SbF_6$ as the photoinitiator take place very rapidly, are highly exothermic and occur without an induction period. This is especially, impressive in view of the fact that these two compounds possess high levels of steric hinderance about the epoxide reaction site. Under the same conditions, the sesquiterpene epoxide, caryophyllene oxide, 14, does not display the same ability to markedly reduce the induction period in the photopolymerization of POX as epoxides 12 and 13. The specific reason(s) for this anomalous behavior is unknown at this time. However, molecular modeling showed that due to the fused four-membered ring, the exocyclic double bond, the trans-epoxide group, and the nine-membered ring, 14 is a conformationally very rigid cyclic molecule in which access to the epoxide group is severely restricted. We suggest that a combination of these factors results in the observed poor reactivity of caryophyllene oxide as an accelerator for oxetane photopolymerizations.

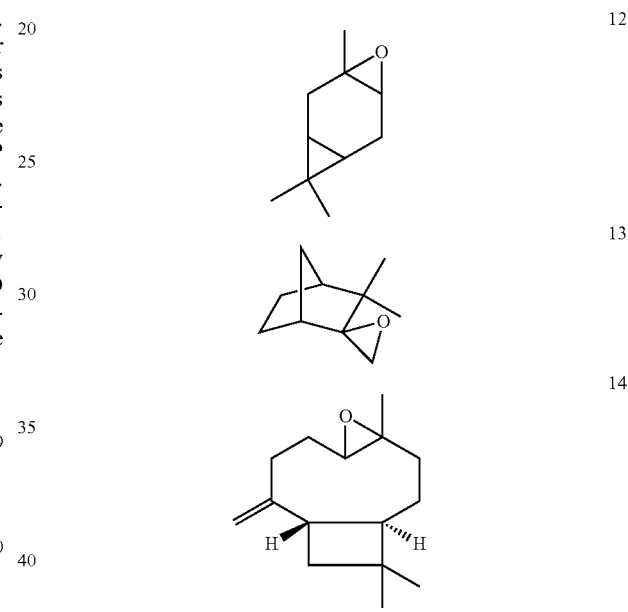

In a direct analogy to the results described above, other terpene epoxides such as those derived from b-pinene, myrcene, farnesene, squalene, g-terpinene, and natural rubber are expected to behave as photopolymerization accelerators for oxetanes. Like LDO, some of these terpenes, such as terpinolene56, contain multiple alkene sites that can be epoxidized. These terpene epoxides should provide interesting ways to both accelerate the photopolymerizations of oxetanes as well as modify the nature of the resulting crosslinked networks.

Figure 8:
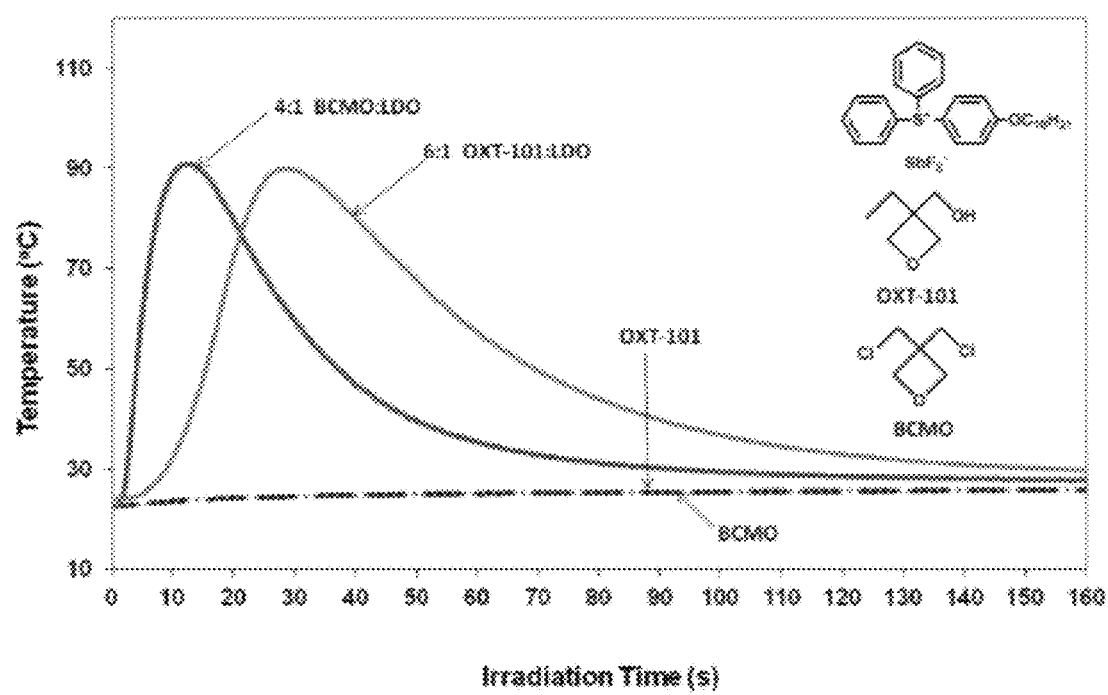
FIG. 8. OP study of the photopolymerizations of 3,3-bis (chloromethyloxetane) (BCMO) and 3-ethyl-3-hydroxymethyloxetane (EHMO) alone and as mixtures with LDO (4.0 wt % SOC-10 SbF$_6$, light intensity 1640 mJ cm$^{-2}$ min$^{-1}$)

It was of some interest to examine the scope of the accelerating effects of LDO and some of the other related epoxides on the photopolymerizations of monomers with different oxetane structures. FIG. 8 displays the results obtained when 3,3-bis(chloromethyl)oxetane (BCMO) and 3-ethyl-3-hydroxymethyloxetane (EHMO) are photopolymerized alone and mixtures with LDO. In both cases, 4 wt % SOC-10 $SbF_6$ was used as the photoinitiator The polymerizations of both these monomers occurs very slowly in the absence of LDO. However, a dramatic and very rapid polymerization of BCMO takes place with no induction period when LDO is added. The results are very comparable to those previously obtained with POX. Although the reactivity of EHMO is somewhat lower than either BCMO or POX, the addition of LDO profoundly accelerates the polymerization.

Figure 9:
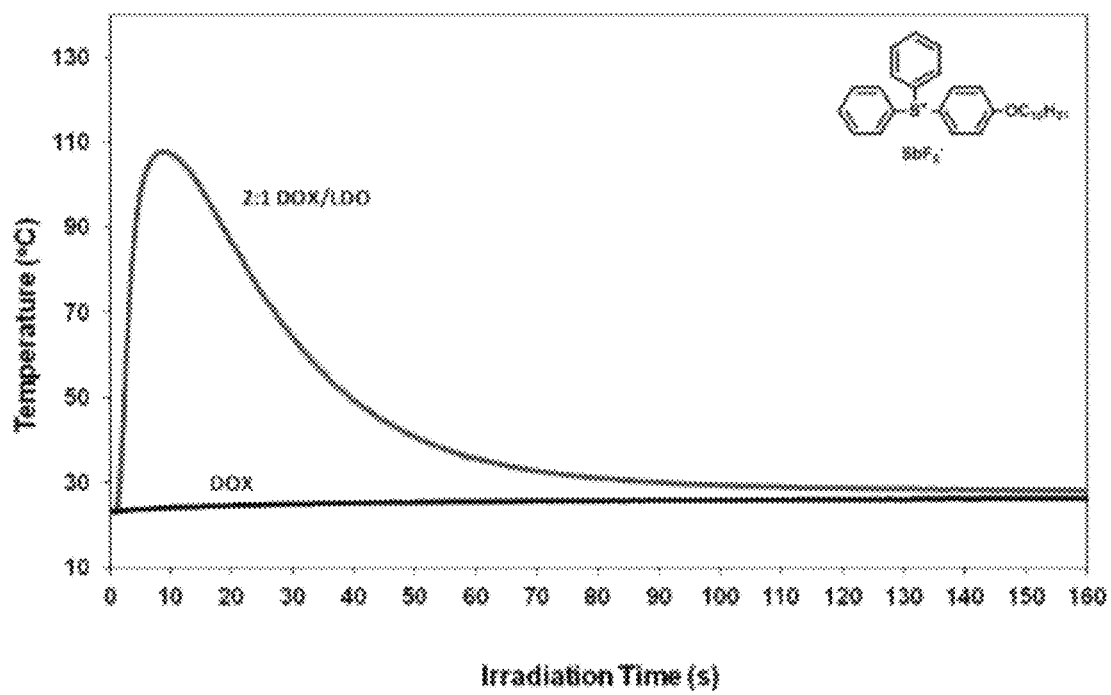
FIG. 9. Acceleration of the photopolymerization of DOX by LDO (2:1 molar mixture) in the presence of 4.0 wt % SOC-10 SbF$_6$ compared to DOX without LDO. (light intensity 1640 mJ cm$^{-2}$ min$^{-1}$)

It was of special interest to determine whether the acceleration with LDO and the other related epoxide accelerants could also be applied to the photopolymerizations of difunctional oxetane monomers since those monomers are of most importance for use in many practical applications. Shown in FIG. 9 is a side-by-side comparison of the reactivity of 3-ethyl-3-{[(3-ethyloxetane-3-yl)methoxy]methyl}oxetane (DOX) and a 2:1 molar mixture of DOX with LDO carried out in both cases using 4.0 wt % SOC-10 $SbF_6$.

The DOX reference sample shows the typical, very long induction period (longer than 3 minutes) during which little polymerization takes place under continuous UV irradiation. At the same time, irradiation produces almost an instantaneous polymerization response in the 2:1 molar mixture of DOX and LDO. The difference is dramatic. After photopolymerization, a clear, colorless, tack-free film of the DOX-LDO sample was obtained. The film was somewhat brittle when creased. The polymer was insoluble in chloroform, ethyl acetate and acetone.

Figure 10:
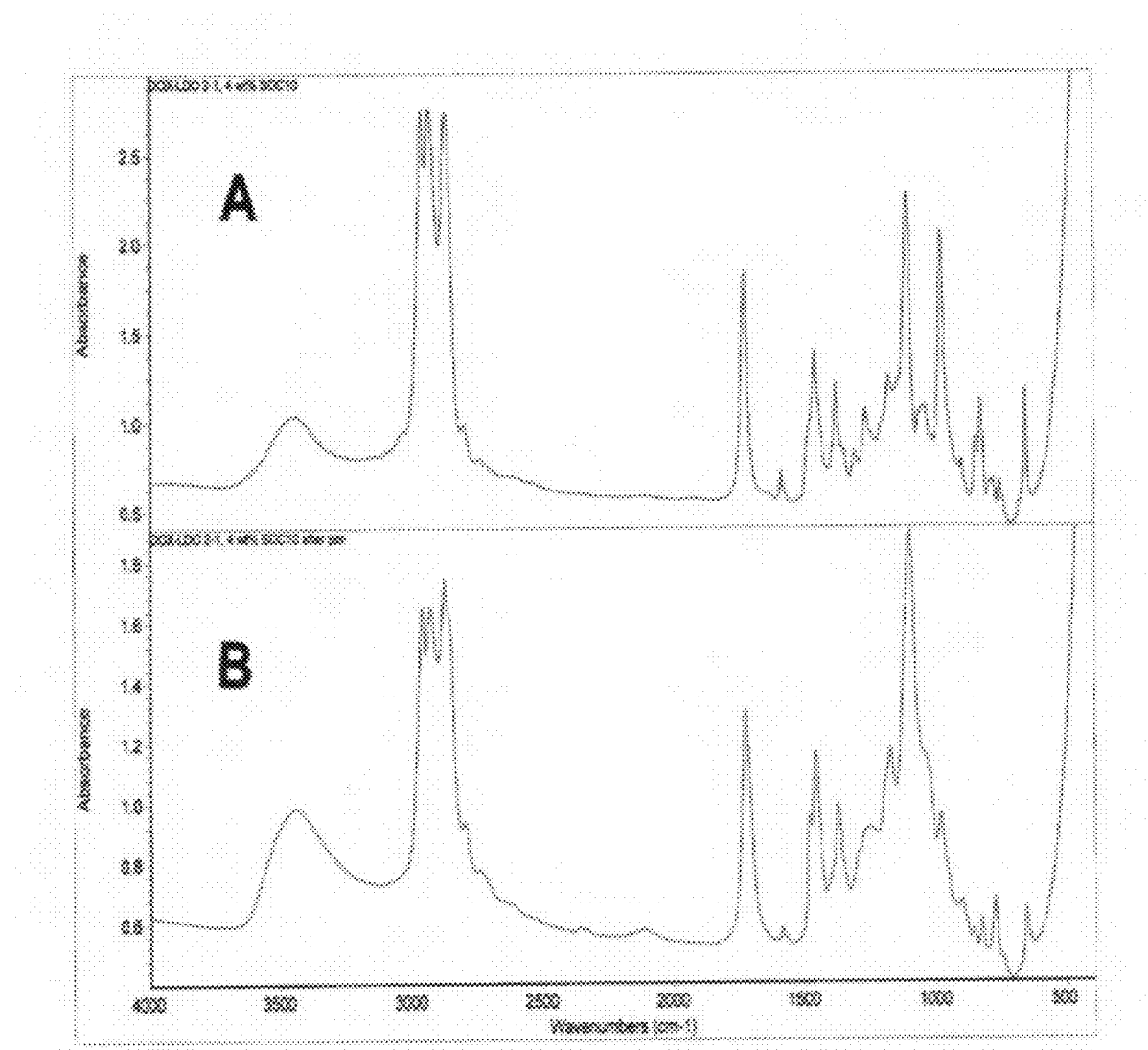
FIG. 10. FT-IR of a 2:1 molar mixture of DOX and LDO containing 4.0 wt % SOC-10 SbF$_6$, A, before photopolymerization and B, after polymerization. (UV irradiation carried out at 1640 mJ cm$^{-2}$ min$^{-1}$ for three minutes).

The course of the photopolymerization was also followed by FT-IR with the DOX/LDO mixture deposited on a KBr disc and the results are presented in FIG. 10. The DOX monomer used in this study possesses a strong carbonyl peak at 1728.5 $cm^{-1}$ probably due to residual cyclic carbonate linkages remaining from incomplete monomer synthesis. Prior to photopolymerization, the IR also shows the presence of a small OH peak. Commercially supplied DOX contains a number of volatile and nonvolatile impurities. Even after attempted purification by vacuum fractional distillation, the above-mentioned peaks are reduced in intensity but remain and it appears that some impurities may co-distill with DOX. After photopolymerization, the 3038 $cm^{-1}$ peak associated with the 8,9-epoxide of LDO disappears. A band at 980.8 $cm^{-1}$ that is unique to DOX also vanishes. A ketone band from rearrangement of the 1,2-epoxy group of LDO usually appearing at 1722 cm−1 could not be detected.

Figure 11:
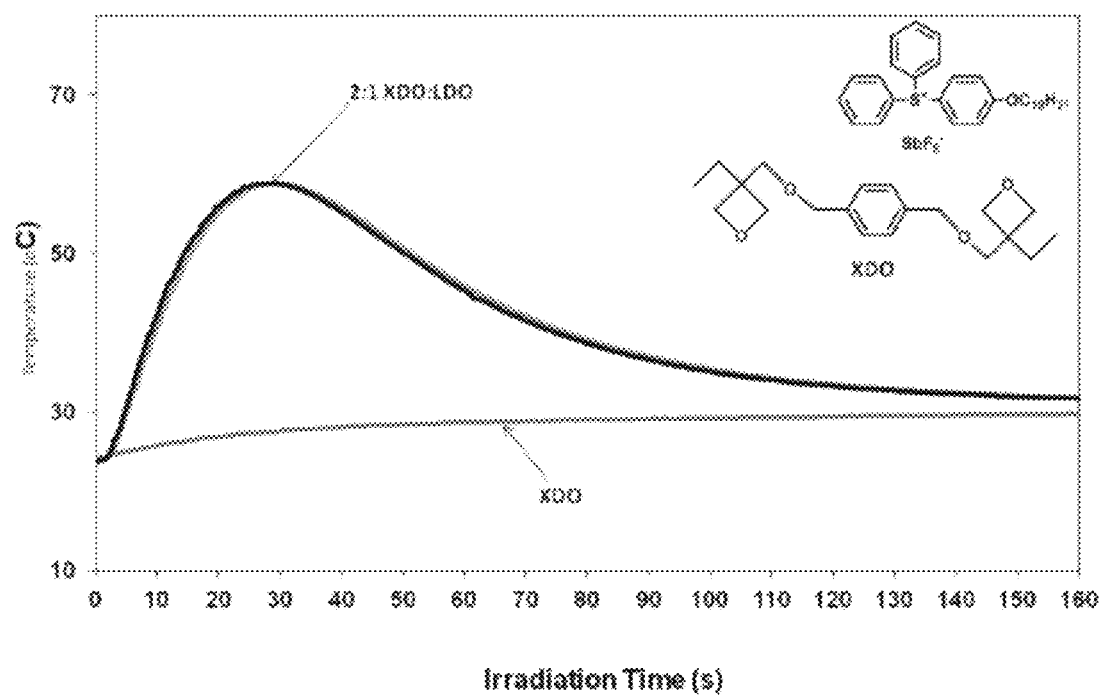
FIG. 11. Acceleration of the photopolymerization of XDO by LDO (2:1 molar mixture) in the presence of 4.0 wt % SOC-10 SbF$_6$ (duplicate runs shown) compared to XDO without LDO. (light intensity 1640 mJ cm$^{-2}$ min$^{-1}$).

A similar OP photopolymerization study was carried out with 1,4-bis{[(3-ethyloxetan-3-yl)methoxy]methyl}benzene (XDO) and is shown in FIG. 11. As can be observed in the OP trace, pure XDO undergoes very sluggish photopolymerization that may be partially due to the high viscosity of this monomer. On the other hand, the inclusion of LDO greatly accelerates the photopolymerization of XDO although even this accelerated photopolymerization may still be partially impeded by viscosity effects.

Figure 12:
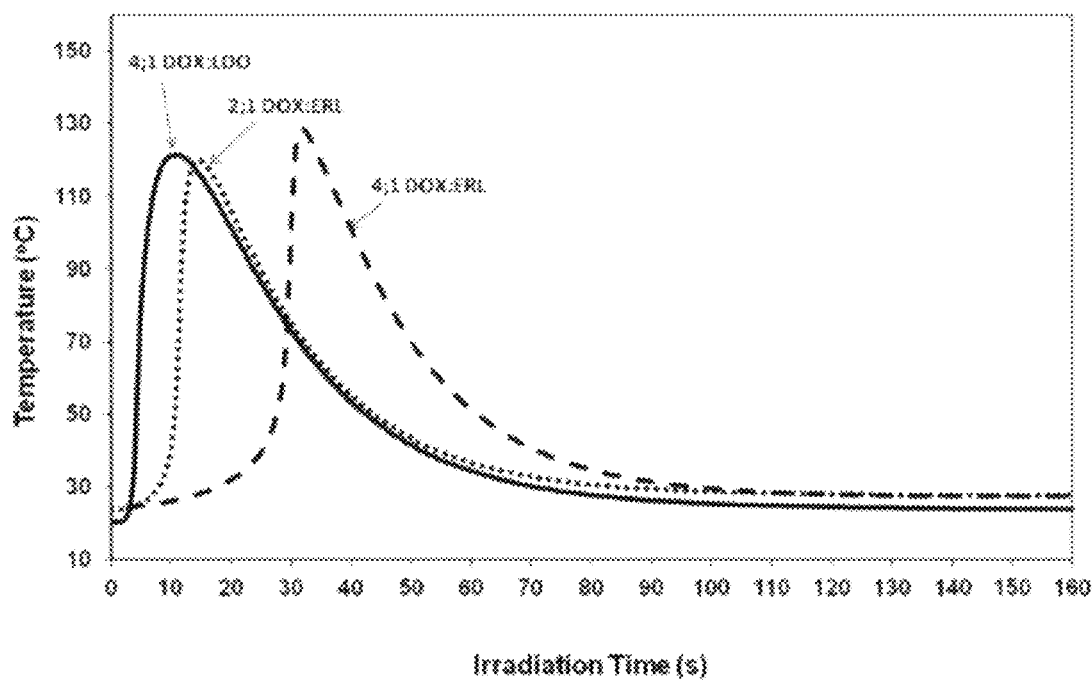
FIG. 12. Comparison of the photoresponse of various mixtures of DOX with LDO and ERL. All photopolymerizations were conducted at 1600 mJ cm$^{-2}$ min$^{-1}$ with 2 wt % SOC-10 SbF$_6$ as the photoinitiator.

As mentioned previously herein, the use of epoxides such as 3,4-epoxycyclohexylmethyl 3',4'-epoxycyclohexanecarboxylate (ERL) to accelerate the cationic ring-opening polymerization has been reported by several investigators (Crivello, J. V.; Sasaki, H. J. Macromol. Sci. Pure Appl. Chem. 1993, A30(2&3), 189-206; Sasaki, H. Toagosei, Co. Ltd. Web publication, www2.toagosei.co.jp/develop/trend/No4/oxetanes.pdf; Sangermano, M.; Malucelli, G.; Bongiovanni, R. Eur. Polym. J. 2004, 40(2), 353-358). It seemed worthwhile to compare the accelerating behaviors of both LDO and ERL on the same oxetane monomer. The results of this study are displayed in FIG. 12 and they show that on a molar basis, LDO is a much better accelerator for the photopolymerization of DOX than ERL. A 2:1 molar mixture of DOX and ERL has nearly the same OP profile as that of a 4:1 molar mixture of DOX with LDO. The effect is even more dramatic if the two mixtures are compared on a weight basis. Decreasing the amount of ERL in the mixture to give a 4:1 molar mixture with DOX results in an appreciably longer induction period. Very similar results were observed when the highly reactive diepoxide monomer 4-vinyl-1,2-cyclohexene dioxide was compared to LDO in the photopolymerization of POX. LDO was a much more effective accelerator for POX than 4-vinyl-1,2-cyclohexene dioxide.

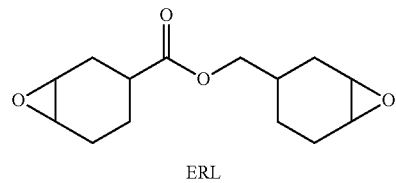 [SMILES: O=C(OCC1CCC2OC2C1)C1CCC2OC2C1]

ERL

Figure 13:
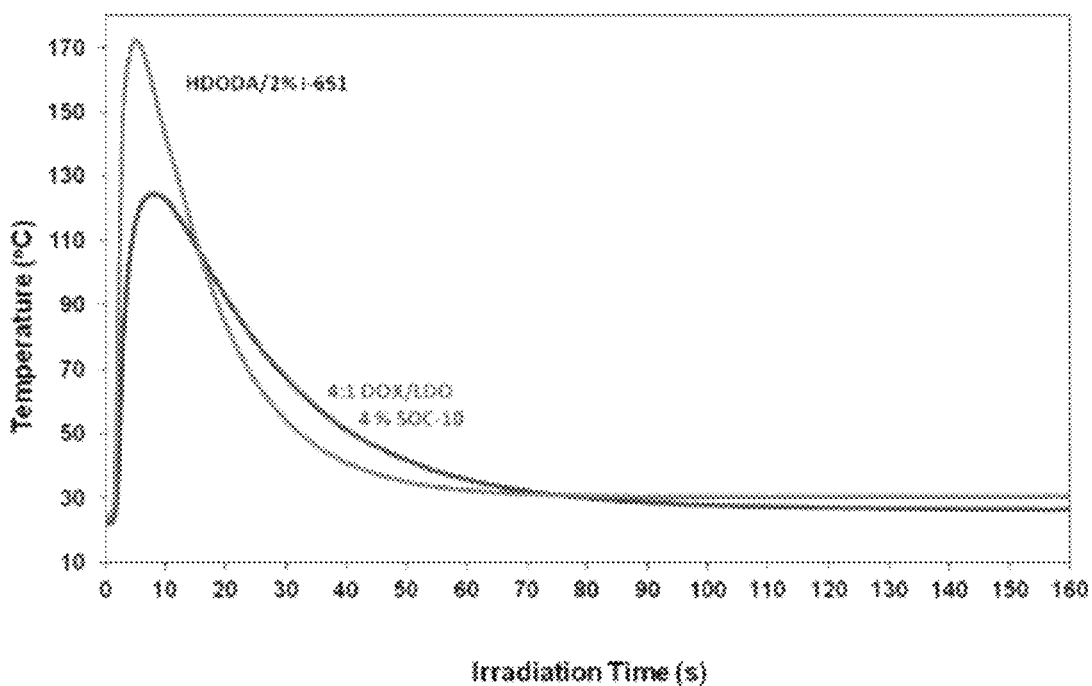
FIG. 13. Comparison of the photopolymerizations of a 4:1 DOX-LDO mixture containing 2 wt % SOC-10 SbF$_6$ as the photoinitiator with the 1,6-hexanediol diacrylate (HDODA) with 2 wt % Iragcure 651.

Shown in FIG. 13 is an interesting comparison of the photopolymerizations of a 4:1 molar mixture of DOX and LDO containing 2 wt % SOC-10 $SbF_6$ as the photoinitiator with 1,6-hexanediol diacrylate (HDODA) with 2% 2,2-dimethoxy-2-phenylacetophenone (Irgacure 651) as the free radical photoinitiator. While the diacrylate is clearly displays almost no induction period and a very high exotherm, the cationic oxetane system accelerated by LDO compares very favorably.

Photosensitized Polymerization

Figure 14:
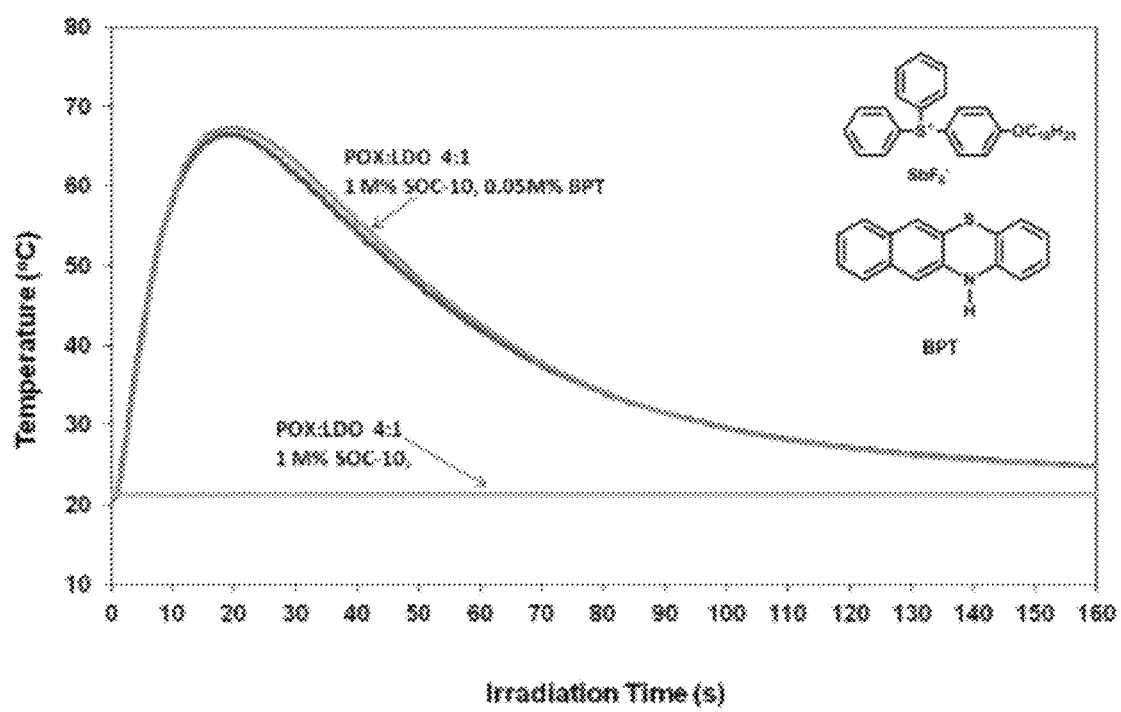
FIG. 14. Photosensitized polymerization of a 4:1 molar mixture of POX and LDO with 1.0 mol % SOC-10 SbF$_6$ alone and in the presence of 0.5 mol % benzo[b]phenothiazine (light intensity 24 mJ cm$^{-2}$ min$^{-1}$).

Photosensitization is an effective strategy for broadening the spectral response of cationically polymerizable monomer systems. The ability to "tailor" the spectral response of a given system is essential to their implementation in applications such as imaging, additive manufacturing, medical adhesives and dental composites that employ long wavelength UV or visible light. Considering the high sensitivity of the current "kick-started" oxetane systems, it was of interest to demonstrate that these materials can be photosensitized to long wavelength UV and visible radiation. Recently, benzothiazines and benzoxazines were reported to be efficient photosensitizers for the photolysis of triarylsulfonium salts (Crivello, J. V. J. Polym. Sci. Part A: Polym, Chem. 2008, 46, 3820-3829). Accordingly, two sample 4:1 molar mixtures of POX and LDO containing 1 mol % SOC-10 were prepared. To one of the samples there were added 0.5 mol % benzo[b]phenothiazine as a photosensitizer. The OP apparatus was modified to interpose a band pass filter in the light beam to allow the passage of only of wavelengths greater than 400 nm. The results of the study are presented in FIG. 14.

The presence of the band pass filter greatly attenuates the incident light that reaches the sample plane. Despite the extremely low light flux levels (24 mJ $cm^{-2}$ $min^{-1}$), the photopolymerization response of the 4:1 mixture of POX and LDO is excellent (curves for duplicate runs are depicted). No appreciable induction period is evident. In contrast, the sample containing no photosensitizer is completely unresponsive during the entire 3 minutes of continuous irradiation period of this study.

Thin Film UV Cure Studies

Figure 15:
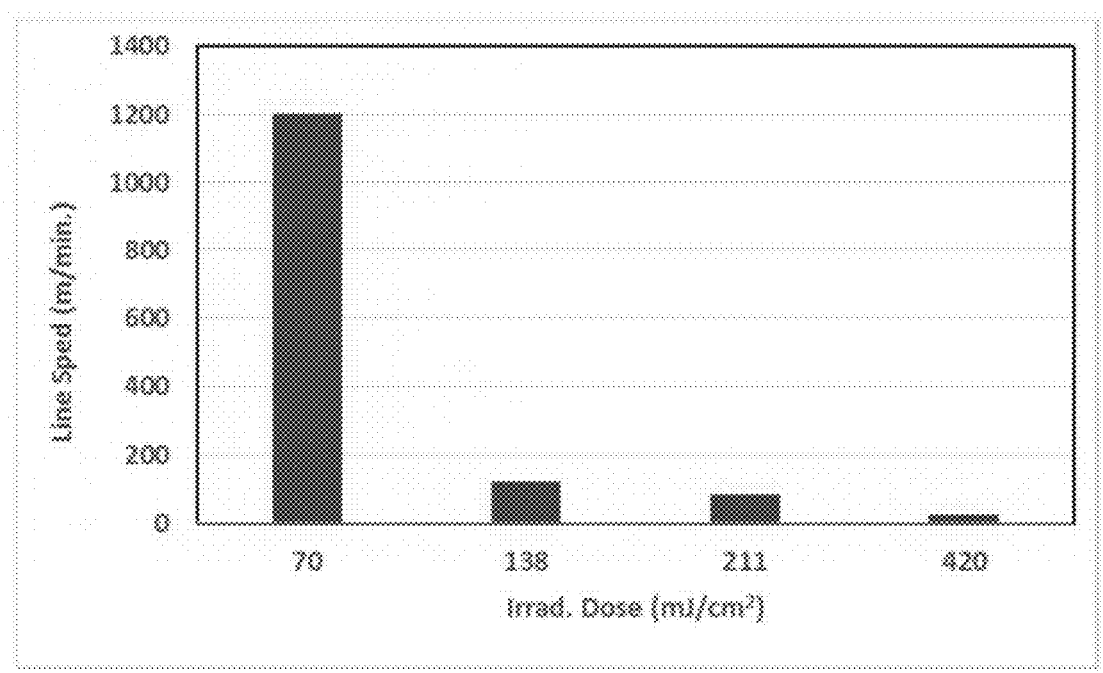
FIG. 15. Thin film UV cure studies (PI=SOC-10 SbF$_6$).

The results obtained from the OP studies described above strongly suggested that oxetane monomers accelerated by LDO, LMO and PO possess rapid photopolymerization rates that that may be compatible with those required for thin film applications such as decorative and protective coatings for metals, plastics and glass, as well as for printing inks and adhesives. To provide confirmation of this conclusion, thin film UV cure studies were conducted using a conveyorized Fusion Systems UV cure apparatus equipped with a 300 W microwave-activated mercury arc lamp. Films were drawn onto steel test panels using a drawknife with a 1 mil (25 mm) gap and placed on the moving conveyor for UV irradiation. The films were tested for tackiness immediately on exiting from the irradiation zone. The maximum conveyor speed and irradiation dose required to reach the tack-free state were recorded and the results are included in bar graph shown in FIG. 15. Four different oxetane and oxetane-epoxide mixtures were tested using the above protocol: 1) a 4:1 molar mixture of DOX and LDO with 1.0 wt % SOC-10 $SbF_6$; 2) a 4:1 molar mixture of DOX and LDO with 2.0 wt % SOC-10 $SbF_6$; 3) a 4:1 molar mixture of DOX and ERL with 2.0 wt % SOC-10 $SbF_6$; and 4) DOX with 2 wt % SOC-10 $SbF_6$. All the fully UV cured samples were colorless, glossy and hard.

The thin film UV cure results confirm the conclusions made on the basis of the OP observations. Using 1.0 wt % SOC-10 SbF6, the maximum conveyor speed that was measured was 80 m/min with a 4:1 mixture of DOX and LDO. With 2.0 wt % of photoinitiator, it was possible to attain cure speeds of at least 1200 m/min with the same mixture of DOX and LDO. At these high speeds, it was only possible to determine approximate values for both the line speed and dose and the actual values may be considerably higher. In contrast, when LDO was omitted, cure was not observed with POX alone even at the slowest speed (80 m/min) and highest dose of UV radiation (420 mJ $cm^{-2}$) used. The maximum cure speed for the 4:1 molar DOX/ERL mixture lies between 180 and 240 m/min., indicating that ERL is considerably less efficient than LDO in accelerating DOX photopolymerization.

UV Curing Technology

Present invention makes it possible to use cationic oxetane photopolymerizations in many high-speed coatings, printing inks, adhesives, as well as in additive manufacturing processes such as stereolithography, digital imaging and in ink-jet printing. In addition, the use of such technology can also be applied to many other other photocurable applications including: dental composites, sealants, encapsulants, conformal coatings, decorative and protective coatings for metals, glass, wood and plastics. UV curable oxetane-functional silicones are excellent prospective materials for release coatings. Essentially, the novel UV and visible light curable oxetane materials can be applied to any application where currently epoxide monomers and epoxide functional oligomers are used. Compared to those epoxide materials, the novel oxetanes are more reactive and are also attractive since they are derived from readily available renewable substrates.

Figure 16:
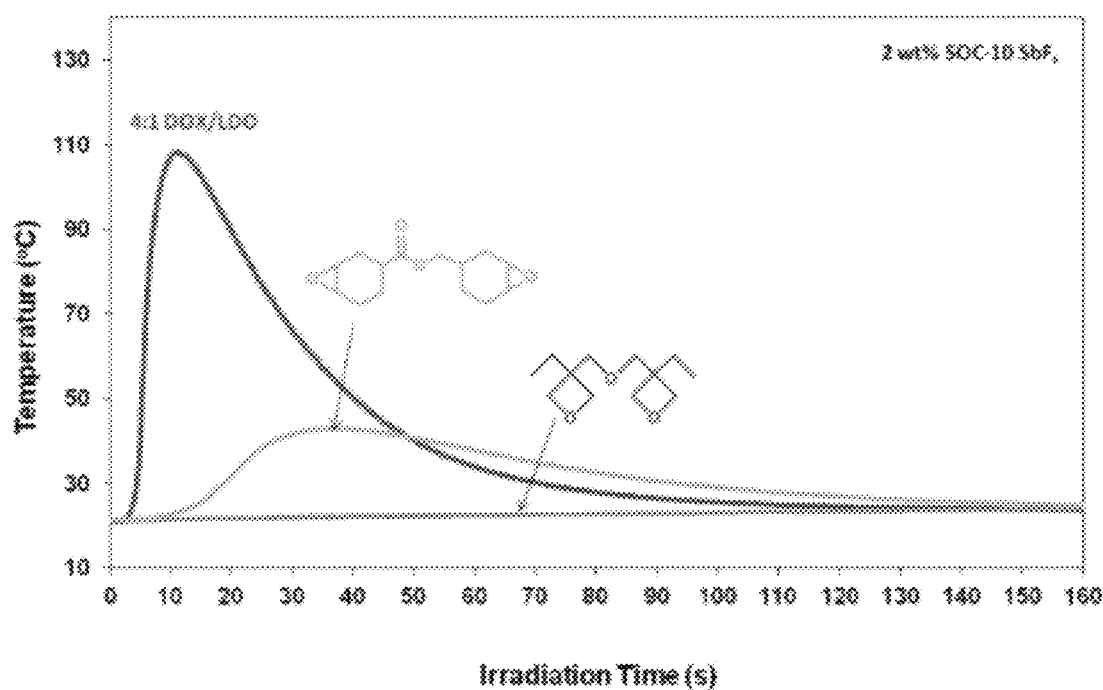
FIG. 16. Comparison of the photopolymerizations of DOX, 3,4-epoxycyclohexylmethyl 3',4'-epoxycyclohexane carboxylate (ERL-4221) and a 4:1 molar mixture of DOX and LDO (limonene dioxide) using 2 wt % SOC-10 as the photoinitiator.

A direct comparison of a typical "kick-started" oxetane system with the most commonly used epoxide monomer, 3,4-epoxycyclohexylmethyl 3',4'-epoxycyclohexane carboxylate (ERL-4221) is given in FIG. 16. The three samples shown were compared using Optical Pyrometry at an irradiation intensity of 912 $mJ/cm^{-2}$ $min^{-1}$.

The results are pretty clear. ERL is a much less reactive monomer than the "kick-started" oxetane system. It should be possible to replace ERL in most applications with these new oxetane systems. In addition, the 'kick-started" oxetane system was completely clear and transparent upon UV cure and this is very interesting for many applications. Still further, the UV cured DOX-based oxetane system appears to be less brittle than comparable ERL monomer.

Figure 17:
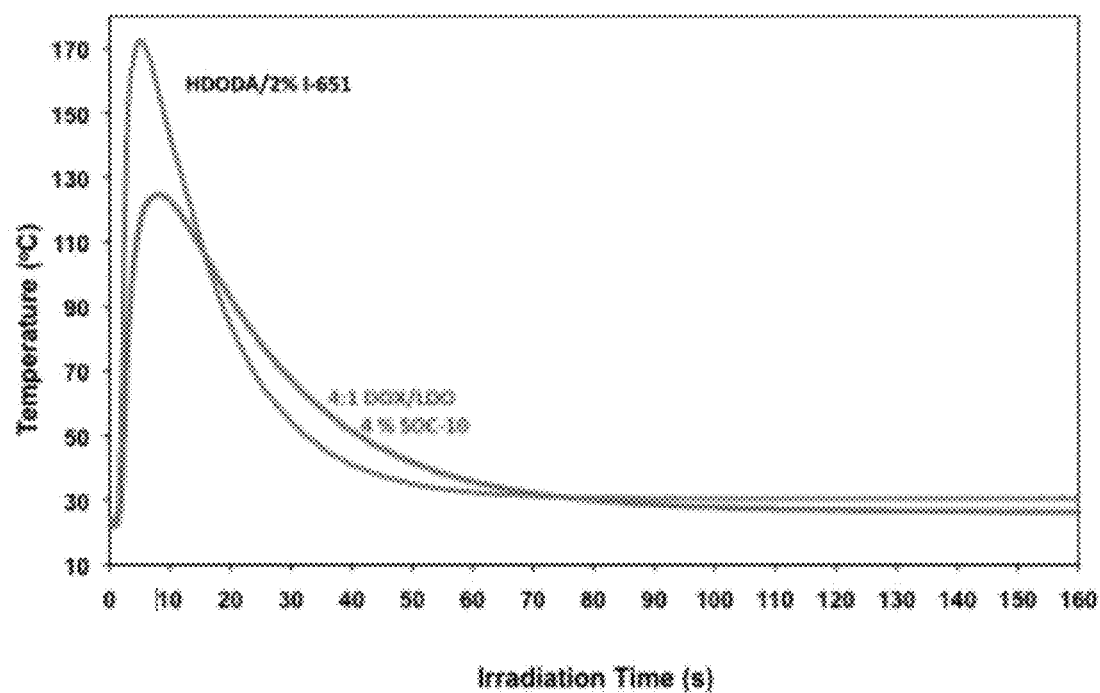
FIG. 17. Comparative photopolymerizations of a 4:1 molar mixture of DOX and LDO (4 wt % SOC-10 as photoinitiator) with 1,6-hexanediol diacrylate using 2 wt % Irgacure 651 as the photoinitiator.

"Kick-started" oxetane monomer compositions possess high reactivity as shown below in FIG. 17 that approaches that of the free radical polymerization of acrylates. This means that they can also replace in some applications, traditional UV curable acrylate monomers. Shown in FIG. 17 is direct comparison of a 4:1 "kick-started" cationically photocured oxetane formulation with a free radical UV cured formulation using 1,6-hexanediol diacrylate (HDODA). Further, like epoxides, the cationic photopolymerizations of oxetanes is compatible with the free radical photopolymerization of acrylate and methacrylate monomers. This means that concurrent polymerizations of these two monomers can be successfully carried out. Moreover, the high photopolymerization rates of the kick-started oxetane monomers are much greater than those of most cationically photopolymerizable epoxides and comparable to that of acrylate monomers. This means that the hybrid systems consisting of kick-started oxetanes together with multifunctional acrylates or methacrylates should be especially interesting and useful. Such hybrid cationic and free radical systems are widely used in stereolithography, digital imaging and in ink-jet printing. Using such systems, it may be possible to develop good green strength as well as good final properties without appreciable post-curing. Alternatively, it may be possible to dispense entirely with the free radical monomer that is usually included to provide green strength. At the same time, these applications may benefit substantially from the reduction in volume shrinkage that is inherent in the ring-opening photopolymerizations of oxetane monomers.

E-Beam Curing Technology

A number of years ago, work in this laboratory demonstrated that the cationic polymerization of epoxide monomers can be induced using electron-beam irradiation. The same diaryliodonium and triarylsulfonium salt cationic photoinitiators as normally employed for light-induced photopolymerizations could be used for this purpose. This technology could be applied in practice only to the most reactive epoxides. As mentioned previously, the reactivity of "kick-started" oxetanes compares favorably and actually exceeds that of most epoxide monomers. The outstanding reactivity of the "kick-started" oxetane systems makes it possible to propose that the polymerizations of these materials will also prove highly applicable in e-beam curing applications. At the present time, e-beam curing is being employed in many high speed curing applications such as those used to cure inks on packaging materials. Further applications lie in the e-beam curing of carbon-fiber-reinforced composites such as those used in high performance aerospace components, sporting equipment (eg. tennis rackets, fishing rods, golf club shafts, etc.). These composites cannot be cured using UV light and must undergo long energy-intensive thermal cures in autoclaves.

Thermally-Induced Cationic Polymerizations

Epoxide monomers and functional oligomers are employed in a wide variety of thermally cured applications. This is the main use of these materials. However, the use of epoxide curing technology is inconvenient and labor intensive. It usually involves the use of two component curing systems consisting of the epoxide component that must be mixed in precise amounts with a second component consisting of a "hardener". The hardener is a material that either reacts spontaneously or with the aid of heat with the epoxide. One component, cationically cured epoxy resins have been described from this laboratory. Typically, they consist of a diaryliodonium salt together with a copper cocatalyst. On heating, the two react and polymerization ensues. These curing systems have been applied with good results to "kick-started" oxetanes. An experimental example is given below. Very rapid cure was achieved. Thermally cured "kick-started" oxetane systems could replace epoxides in such applications as electrical and electronic encapsulations, fiber and particle-reinforced composites, sheet and bulk molding compounds, injection molded thermosets and sealants. Among the many composite applications are high-pressure laminates such as printed wiring boards, pultrusion, filament wound and lay-up laminate structures, vacuum-assisted liquid transfer molding and many others. Further applications can be envisioned in electronic assembly uses such as die attachment adhesives, underfill compositions and in conformal coatings. The use of thermally cured "kick-started" oxetane systems in structural adhesives in the building construction, manufacturing assembly and automotive industries is also envisioned. The encapsulation of LEDs is another application that is currently in operation using epoxies that could be replaced with "kick-started" oxetane systems. There is also a broad area of application in injection and compression molding compounds that could be pursued with "kick-started" oxetane systems. These are low melting solid, inorganic-filled molding compounds that are employed for a wide variety of used including: appliance and tool housings, under-the-hood molded automotive components, thermally resistant handles, nobs and pulls for kitchen and industrial use. The observation that "kick-started" oxetane systems are colorless means that they can be combined with dyes or pigments and used to fabricate a wide range of colored objects.

Thermal Cure of DOX-LDO Mixtures

A 4:1 mixture of 0.856 g (0.004 mol) DOX and 0.168 g (0.001 mol) LDO were combined with 2% IOC-8 (0.020 g) in a shallow aluminum pan. The pan was placed in a 150° C. oven. After 2 minutes, the mixture had gelled and hardened.

Redox Polymerizations

In previous work, we have demonstrated that cationic ring-opening polymerizations of epoxides and other monomers may be triggered by redox catalytic systems at or below room temperature through the use of diaryliodonium or triarylsulfonium salts in the presence of a reducing agent such as a silane and noble metal catalyst. Such redox "triggered" polymerizations have not yet been applied to "kick started" oxetane systems. However, it is predicted that these novel monomer systems would exhibit a high response to such curing conditions. The spontaneous nature of the cure of these systems suggests their use in such interesting applications as reaction-injection molding that is applicable to the fabrication of very large scale molded parts.

"Kick-started" oxetane systems described herein may include the following three components: (1) an oxetane monomer or functional oligomer; (2) an epoxide accelerant, which may be a 2,2,3,3-tetra-, 2,2,3-tri-, or 2,2-dialkyl epoxide; and (3) a photo-, e-beam, thermal-, or redox cationic curing system.

The oxetane monomers and oxetane-functional oligomers can be broadly defined as mono-, di-, tri- or poly-oxetane monomers. In one embodiment, the invention applies to 3-mono- or 3,3-di-substituted oxetanes that are free of 2 or 5 substituents. Non-limiting examples of the structures of a number of these monomers and functional oligomers are depicted below. It is also to be noted that in practical applications, mixtures of oxetane monomers or oxetane functional oligomers would be most often employed.

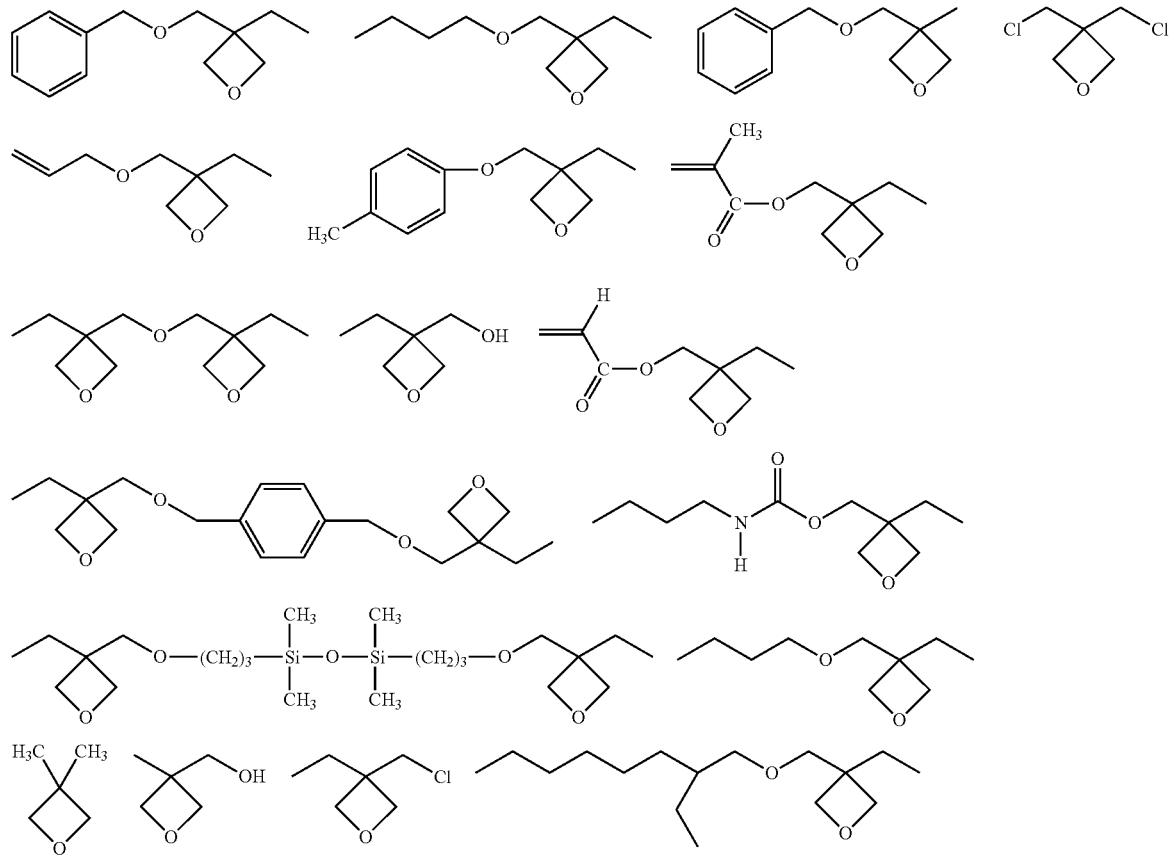

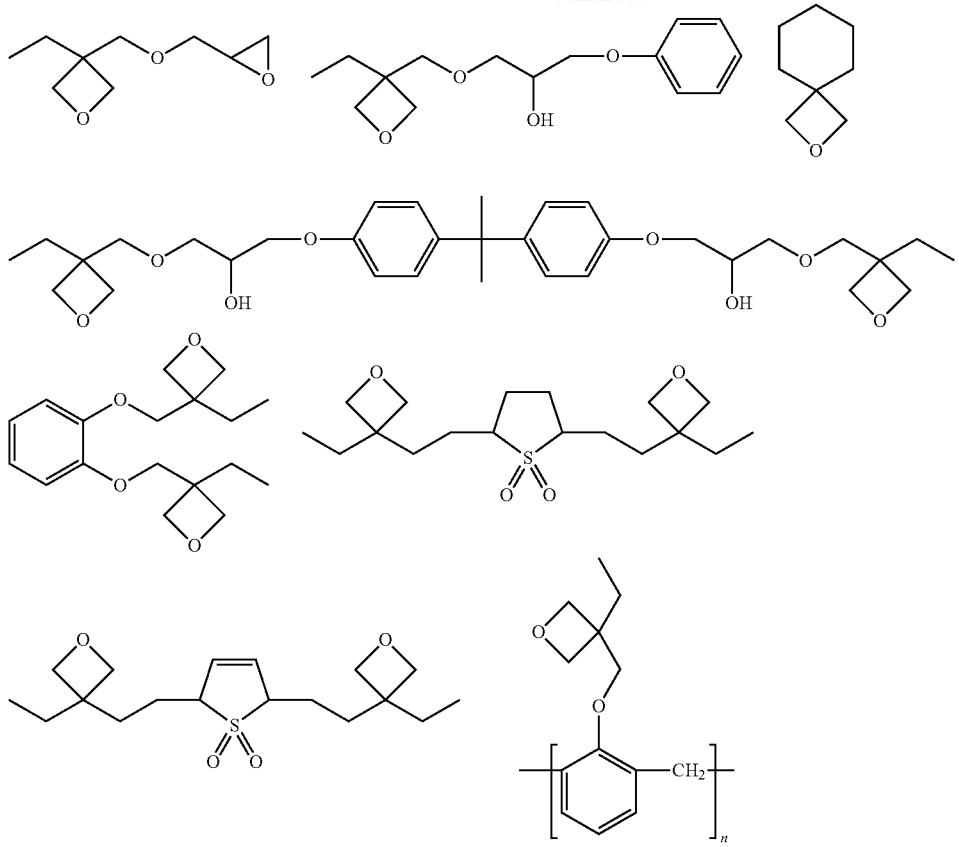

The applicable epoxide accelerants may consist of open chain or cyclic epoxide compounds. Of particular importance are terpene oxides (epoxides) that are either commercially available such as limonene oxide or limonene dioxide or readily prepared by a variety of standard epoxidation techniques. It is also to be noted that in practical applications, mixtures of such epoxide accelerants would be most often employed along with the indicated oxetanes. Some non-limiting examples of epoxide accelerants are shown below.

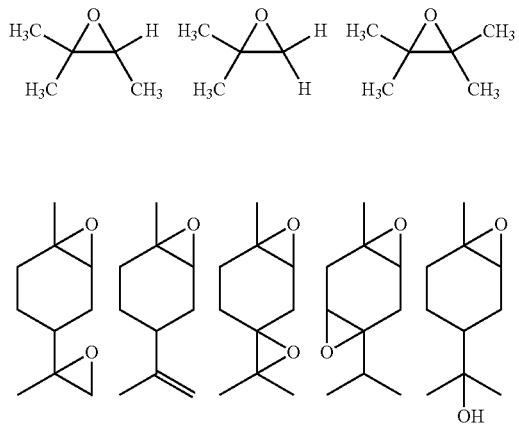

-continued

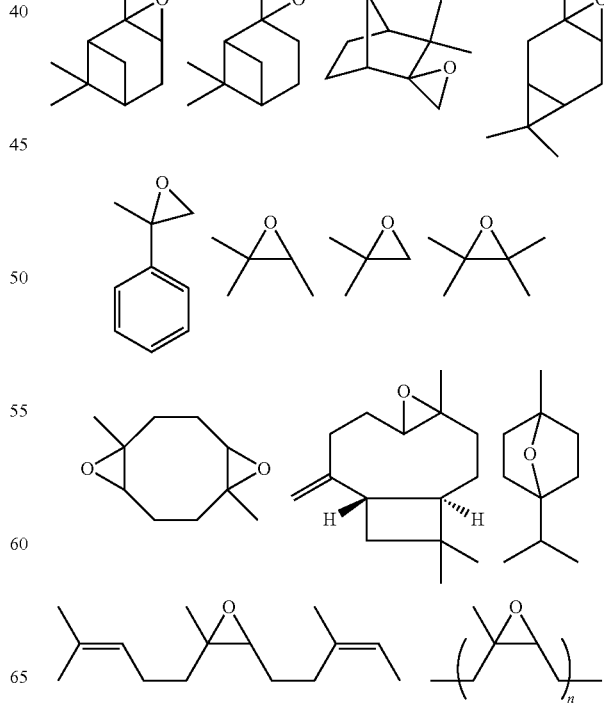

-continued

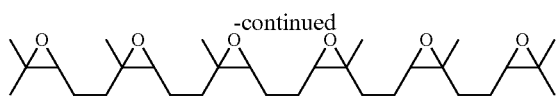

In one embodiment, the effective range of the oxetane component in the mixture to the epoxide can be broad such that the ratio of oxetane to epoxide functional groups can be varied from 1:1 to 32:1. In another embodiment, the ratio of oxetane to epoxide functional groups may be from 4:1 to 16:1.

Not intending to be bound by the mechanisms of any of the reactions disclosed here, the following equations 12 and 13 display examples of some likely mechanistic considerations of some of the discussed herein polymerization reactions.

tion periods. We have termed this acceleration effect as "kick-starting" and have proposed that the protonation of the epoxide generates a carbocationic species that rapidly and efficiently alkylates the oxetane monomer thereby initiating polymerization. While these same epoxides also provide appreciable acceleration effects for the photoinitiated cationic ring-opening polymerization of other epoxides such as alkyl glycidyl ethers, the effects are much less.

The disclosed epoxides are effective oxetane photopolymerization accelerators at low concentrations. This discovery makes oxetane-based monomer systems potentially interesting for a wide variety of applications such as in coatings, adhesives, printing inks, composites and 3D imaging where high rates of photopolymerization are required. An especially interesting potential application lies in the use of the "kick-started" oxetane systems described in this

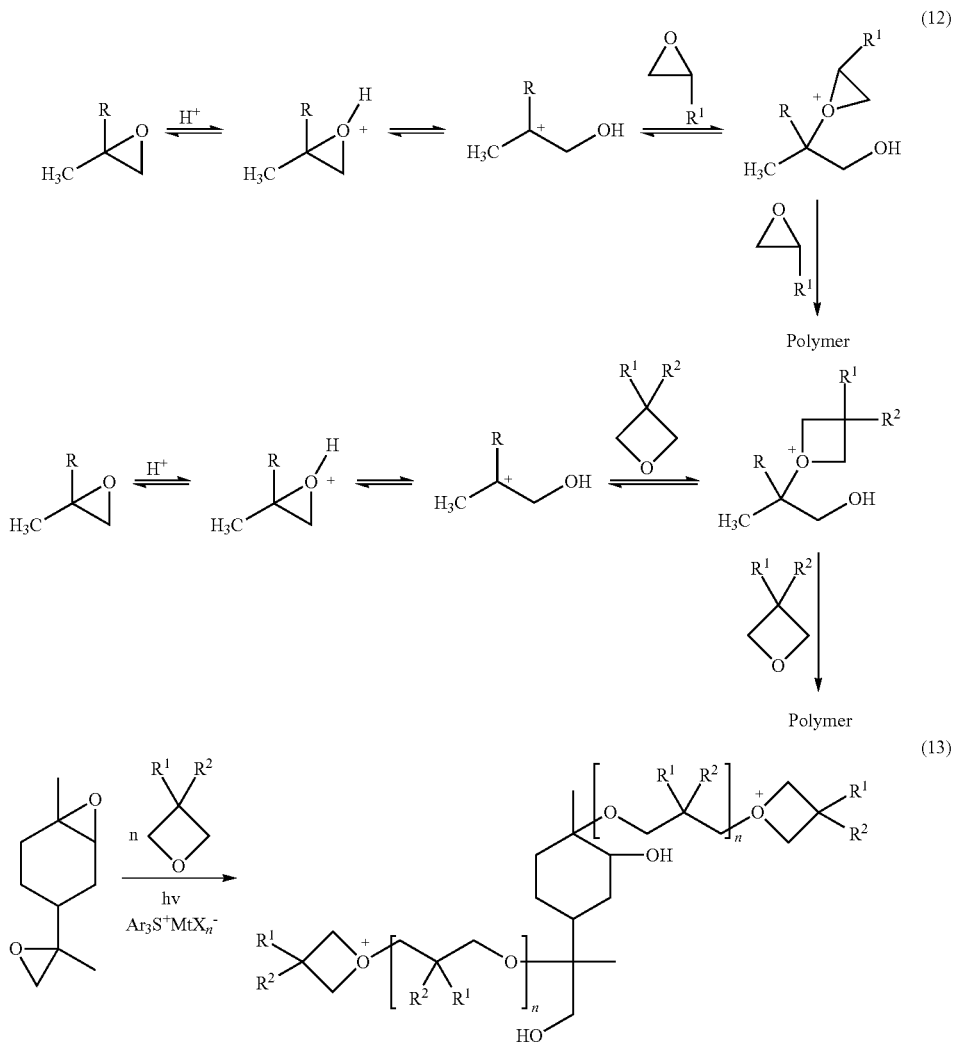

In this disclosure, the acceleration of the cationic ring-opening photopolymerizations of a number of mono- and difunctional oxetanes by coreaction with limonene dioxide as well as a number of other 2,2-di-, 2,2,3-trialkyl and 2,2,3,3-tetraalkyl-substituted epoxides was demonstrated. In all but one case (caryophyllene oxide), these epoxides were highly effective in accelerating the photopolymerization of 3,3-disubstituted oxetanes by markedly reducing the inducarticle in photocurable dental composites. The main attractive feature of these systems in this specific application lies in their inherent low volume shrinkage during photopolymerization (Nuyken, O.; Böhner, R.; Erdmann, C.; Macromol. Symp. 1996, 107(1), 125-138; Penczek, S.; Kubisa, P.; Matyjaszewski, K. Adv. Polym. Sci. 1985, 68/69, p. 163). The volume shrinkage for oxetanes (eg XDO 3.9%) is substantially lower than for comparable epoxides and is much lower than for acrylate or methacrylate monomers (Nuyken, O.; Böhner, R.; Erdmann, C. Macromol. Symp. 1966, 107, 125-138). Cure shrinkage is one of the main contributors to failure of dental composites and the reoccurrence of dental caries. Accordingly, oxetane monomers have been targeted for use in dental composite applications (Moszner, N.; Salz, U. Polymers for Dental and Orthopedic Applications, Chapter 2, Shalaby, S. W.; Salz, U. editors, CRC Press, Boca Raton, Fl, 2007, p. 36). Similarly, low volume shrinkage is also a major factor in the selection of photopolymer systems for additive manufacturing applications where a high degree of image fidelity and lack of distortion is required. Preliminary studies have also shown that the thermally induced and redox initiated cationic polymerizations of oxetane-limonene dioxide mixtures display very similar "kick-started" behavior.

Oxetane-Functional Silicone Release Agents

Current photocurable silicone release agents are based on the photoinduced crosslinking of epoxy-functional silicone oligomers. These oligomers are derived from the noble metal (usually platinum or rhodium) catalyzed hydrosilation of Si—H functional poly(dimethylsiloxanes) (silicones) with a vinyl epoxide, most commonly, 4-vinylcyclohexene oxide. The synthesis of these epoxy-functional poly(dimethylsiloxanes) is depicted in equation 14. Control of the number and position of the epoxy groups along the silicone polymer backbone allows one to design photocurable silicone release agents with different release characteristics for specific applications. It also allows the design of the coating and spreading characteristics of the neat epoxy-functional silicone polymers. Generally, the hydrosilation reaction is carried out at 60-100° C. in the absence of a solvent. The epoxy-functional silicone products of this reaction are colorless liquids and their viscosities depend on the length of the silicone chain.

required. A number of these agents have been developed (Eckberg, R. P. LaRochelle, R. W. U.S. Pat. No. 4,279,717, Jul. 21, 1981, to G. E. Corp.; Eckbberg, R. P. U.S. Pat. No. 4,977,198, Dec. 11, 1990, to G. E. Corp.; Castellanos, F.; Fouassier, J. P.; C. Priou, C.; Cavezzan, J. U.S. Pat. No. 5,668,192, Sep. 16, 1997 to Rhone-Poulenc). They fall into two classifications: diaryliodonium salts and triarylsulfonium salts. The structures of several examples of these photoinitiators are given below. This is by no means a comprehensive list.

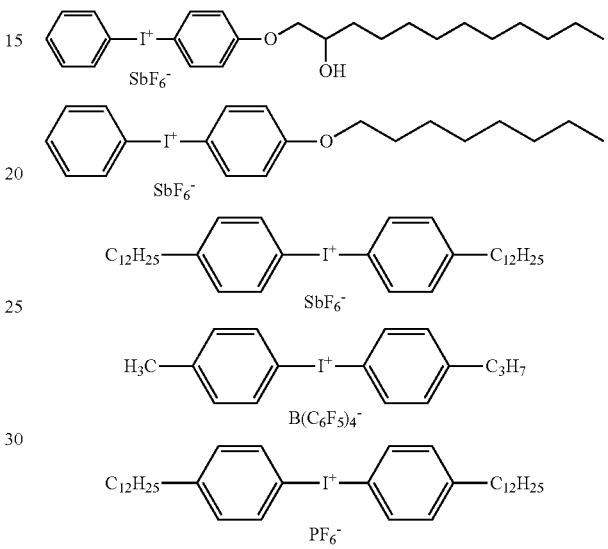

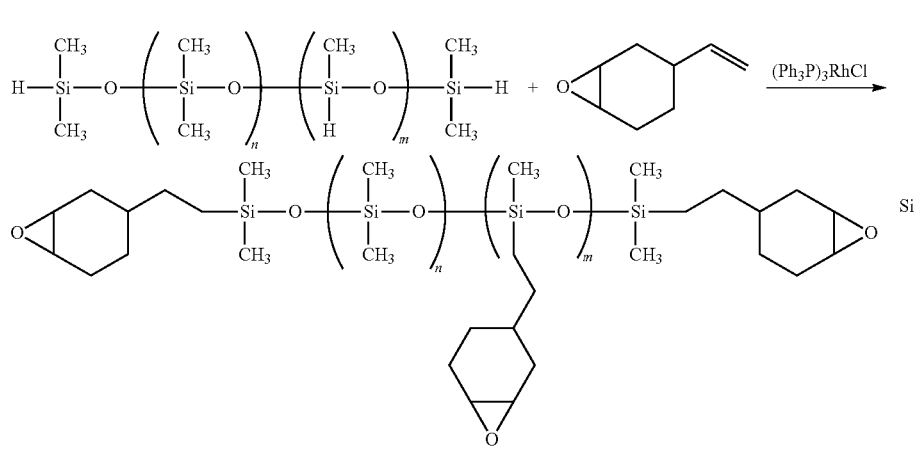

(14)

As noted, the above synthesis requires the use of 4-vinyl cyclohexene oxide. However, handling this chemical is problematic due to its toxicity and the toxicity of the impurities present in the commercially obtained material. Further, the synthesis of this intermediate requires the epoxidation of 4-vinyl cyclohexene. Epoxidation chemistry is considered a specialized process and is only conducted by a few companies due to the industrial handling hazards of handling peroxides.

In the application and UV cure of epoxy-functional silicone release agents, a compatible cationic photoinitiator is -continued

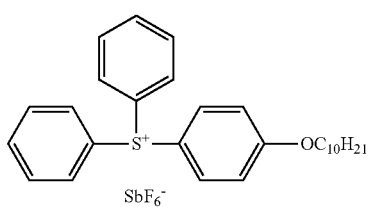

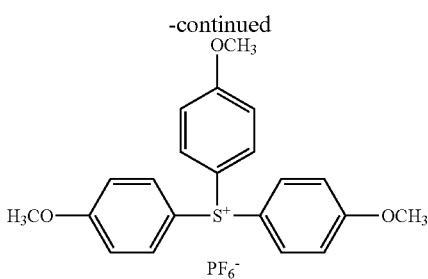

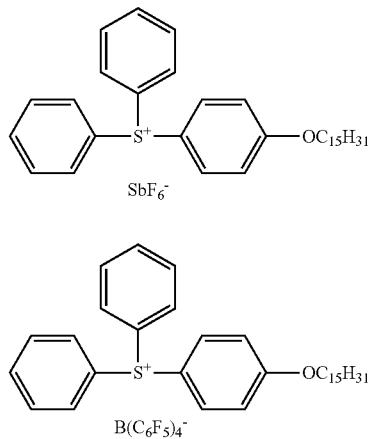

Solventless photocurable epoxy-functional poly(dimethylsiloxane) release agents are combined with a diaryliodonium or triarylsulfonium salt photoinitiator and spread as thin film onto paper, metal, glass or plastic substrates and then subjected to UV irradiation. Rapid photopolymerization results in dry films that can be rolled up and used immediately. Typically, the photopolymerization (termed conversion) takes place on a continuous web. Coating is accomplished by various means, usually employing a precision roll coater, gravure coater, or knife coater. The substrate is transferred from a pay-out reel, passed through the coater that applies a thin film of the modified silicone and then under a UV lamp or series of lamps for irradiation. The substrate is then directly wound onto a take-up reel. Rates of application and UV cure can be as rapid as 1000 to more than 2000 ft/min. In most cases, the substrate is paper and the types of papers that are used are many and varied.

The photocure technology of silicone release agents at the high rates mentioned above requires correspondingly very rapid photopolymerization rates. For this reason, the incorporation of the highly reactive epoxycyclohexyl groups shown in equation 14 has been found to be necessary to provide the requisite application and UV cure speeds. It is possible to replace these epoxycyclohexyl groups with other reactive cationically and free radically photopolymerizable functional groups using similar hydrosilation chemistry. For example, poly(dimethylsiloxanes) bearing acrylate functional groups may be photopolymerized using free radical chemistry. However, these release coatings suffer from serious oxygen inhibition effects when the photopolymerizations are attempted in ambient air. To obtain high UV cure rates, these coatings must be carried out under an inert atmosphere. This is not economical. In contrast, the UV cure of epoxy-functional poly(dimethylsiloxane) release coatings are unaffected by the presence of oxygen.

An alternative class of potential silicone release coatings are based on oxetane-functional poly(dimethylsiloxanes). One method for their synthesis is given in equation 15. 3-Ethyl-3-allyloxymethyloxetane undergoes a straightforward hydrosilation to produce oxetane-functional poly(dimethylsiloxanes) as shown in equation 15.

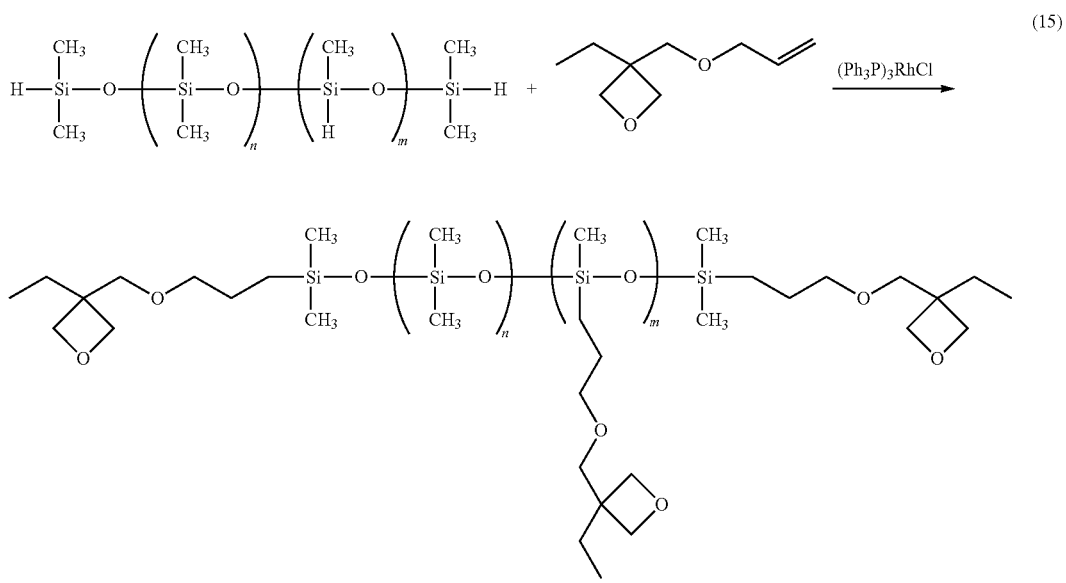

(15)

Similarly, a number of alternative oxetane-containing intermediates can be used to prepare analogous oxetane-functional poly(dimethylsiloxanes) using hydrosilation chemistry. The basic requirement is that the intermediate contain both an oxetane group that will undergo photopolymerization and a vinyl group that can be used to attach it to the poly(dimethylsiloxane) chain by a hydrosilation reaction. Some exemplary structures of several of these intermediates are shown below.

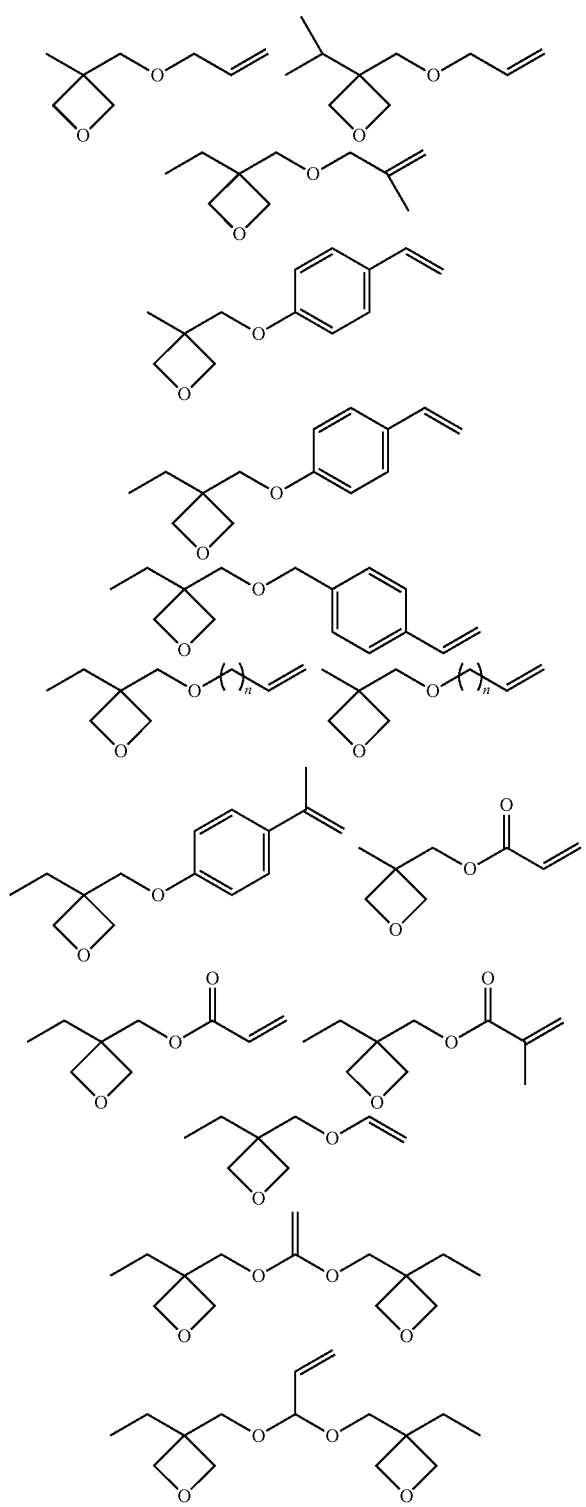

ionic photoinitiators as described above for epoxides. The photopolymerizations of oxetane monomers and oxetane-functional reactive oligomers are not inhibited by oxygen. However, unfortunately, oxetane monomers in general and oxetane-functional poly(dimethylsiloxanes) in particular undergo very sluggish photopolymerizations. For that reason, they are unsuitable for high speed applications and are not offsets for epoxy-silicones as photocurable release agents. For that matter, oxetanes by themselves are not useful monomers for any photocurable application. Oftentimes, oxetanes are copolymerized with epoxides to obtain usable photopolymerization rates. In all cases, heretofore examined, large amounts of epoxides, approaching 50 wt % or greater must be employed in combination with the oxetane monomer.

As disclosed herein, with the incorporation of as little as 5-6 wt % of accelerant epoxides, photopolymerization of oxetanes takes place nearly instantaneously on exposure to UV irradiation. In other words, there is no induction or inhibition period. Based on the current state of technology and knowledge in this field of photopolymerization this was a surprising and unexpected discovery. We demonstrated that the 2,2,3,3-tetrasubstituted epoxides, 2,2,3-trisubstituted epoxides and 2,2-disubstituted epoxides exhibit this accelerating effect at low concentrations while mono-substituted epoxides and 2,3-disubstituted epoxides do not. Most fortuitously, epoxides derived from naturally occurring terpenes fall within the class of those with excellent accelerating activity. It is also a significant finding that the epoxides of these terpenes are easy to prepare and relatively inexpensive. Given below are the structures of some exemplary epoxides useful as accelerators in this invention. Terpenes and terpene oxides are very broad and structurally varied classes of compounds and those depicted below are only a very small subset of potential accelerators that can be used in this invention. Among those listed, limonene dioxide (the first compound shown) is one preferred epoxide accelerant. It contains two epoxide groups that are active accelerator groups in the photopolymerization of epoxides. The substrate, limonene, from which limonene dioxide is obtained is an inexpensive byproduct of the citrus industry. Limonene is isolated by steam distillation of citrus peels. The epoxidation of limonene to produce limonene dioxide can be achieved readily and inexpensively by metal catalyzed reactions involving the use of hydrogen peroxide. It can also be obtained by the use of traditional epoxidizing agents such as peracetic acid. Limonene dioxide is a commercial product at the present time available from a number of industrial suppliers. Limonene dioxide displays a low order of oral, eye and skin toxicity. It is also colorless, possesses no UV absorption, is high boiling with a high flash point and has a low odor. All of these characteristics are important for the use of this epoxide accelerant in photocurable silicone release coatings. Many of these characteristics are shared by other terpene oxides including those depicted below.

In general, oxetane compounds display considerably reduced oral and dermal, acute and chronic toxicity as compared to their epoxide counterparts. In addition, oxetanes are synthesized by simple, direct methods that do not involve epoxidation. For these reasons, oxetanes are desirable as replacements for 4-vinylcyclohexene oxide.

Oxetanes and oxetane modified silicones can be photopolymerized using UV light and the same onium salt cat-

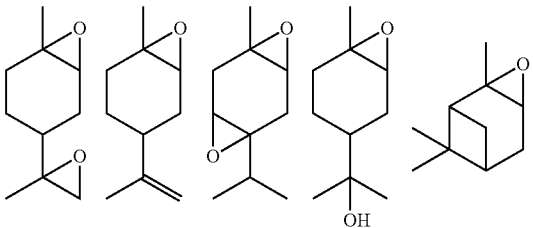

-continued

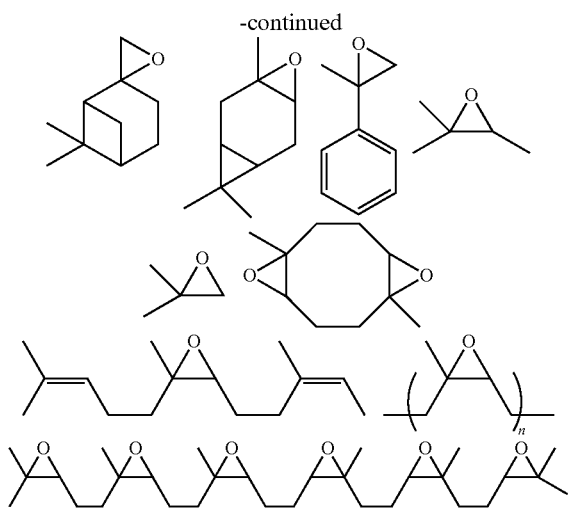

The photopolymerization acceleration effects of these epoxides have been found to be applicable to all oxetane monomers that have been tested. This includes silicon-containing oxetane monomers and polymers. The extension of this technology to the photopolymerizations of oxetane-functional poly(dimethylsiloxane) oligomers useful as photocurable silicone release coatings appears to be straightforward.

The molecular design parameters that have been worked out for the optimization of photopolymerizable epoxy-functional poly(dimethylsiloxane) release coatings (Eckberg, R. P. U.S. Pat. No. 4,256,870, Mar. 17, 1981 to GE Corp.; Eckberg, R. P. to GE Corp. to GE Corp. U.S. Pat. No. 4,576,999, Mar. 18, 1986 to GE Corp.; Eckberg, R. P.; O'Brien M. J. U.S. Pat. No. 5,650,453, Jul. 22, 1997 to GE Corp.; Eckberg, R. P. U.S. Pat. No. 4,348,454, Sep. 7, 1982 to GE Corp.; Eckberg, R. P.; LaRochelle R. W. U.S. Pat. No. 4,421,904, Dec. 20, 1983 to GE Corp.; Agars, R. F.; Eckberg, R. P. U.S. Pat. No. 5,814,679, Sep. 29, 1998 to GE Corp.; Eckberg, R. P.; Hayes, S. E. U.S. Pat. No. 4,370,358, Jan. 25, 1983 to GE Corp.; Eckberg, R. P.—RP U.S. Pat. No. 4,347,346, Aug. 31, 1982 to GE Corp.; Eckberg, R. P.—U.S. Pat. No. 4,547,431, Oct. 15, 1985 to GE Corp.; Desorcie, J. L.; Eckberg, R. P.; Leonard, T. M. U.S. Pat. No. 4,952,657, A, Aug. 28, 1990 to GE Corp.) are directly applicable to the corresponding oxetane-functional poly(dimethylsiloxane) counterparts with the exception of the incorporation of a small amount of the epoxide accelerator. One skilled in the art would employ these design parameters to synthesize oxetane-functional poly(dimethylsiolxane) equivalents with the appropriate number and placement of polymerizable oxetane groups along the backbone of the silicone chain. Similarly, the use of specific photoinitiators, stabilizers, coating aids, dispersing agents, pigments, dyes and other additives will also be analogous to those found in the cited patent literature. Equally similar are the UV irradiation conditions, the coating methods and coating parameters.

Accordingly, in one embodiment, the invention is directed to a process for preparation of an oxetane polymer, the process comprising reacting an epoxide accelerant with one or more (or two or more, for example, from 1 to 50; from 1 to 40; from 1 to 32; from 1 to 30, from 1 to 25; from 1 to 20; from 1 to 10; from 1 to 5; from 2 to 50; from 2 to 40; from 2 to 32; from 2 to 30, from 2 to 25; from 2 to 20; from 2 to 10; and from 2 to 5) equivalents of a 3-monosubstituted oxetane or a 3,3-disubstituted oxetane, wherein the epoxide accelerant is selected from the group consisting of 2,2-substituted epoxide, 2,2,3-substituted epoxide, 2,2,3,3-substituted epoxide, and mixtures thereof.

The reacting of the epoxide accelerant with one or more (or two or more) equivalents of a mono-substituted oxetane or a di-substituted oxetane may be performed under conditions of a photopolymerization reaction, which conditions would be known to a person having ordinary skill in the art. The reacting of the epoxide accelerant with one or more (or two or more) equivalents of a mono-substituted oxetane or a di-substituted oxetane may also be performed under conditions of a thermally induced polymerization reaction, an electron-beam polymerization reaction, or a redox-triggered polymerization reaction, which conditions would be known to a person having ordinary skill in the art.

In one embodiment, the epoxide accelerant does not include limonene 1,2-oxide:

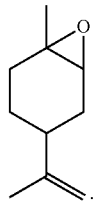

In another embodiment, the epoxide accelerant does not include alpha-pinene oxide:

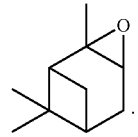

In one embodiment, the epoxide accelerant is selected from the group consisting of 2,2-dialkyl epoxide, 2,2,3-trialkyl epoxide, 2,2,3,3-tetraalkyl epoxide,

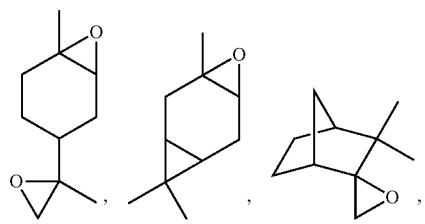

and mixtures thereof.

In another embodiment, the epoxide accelerant is selected from the group consisting of:

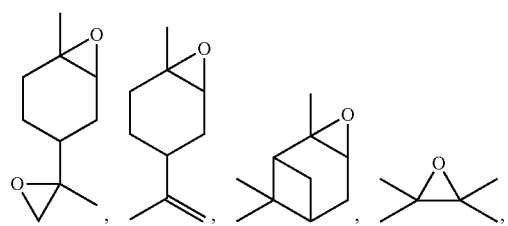

-continued

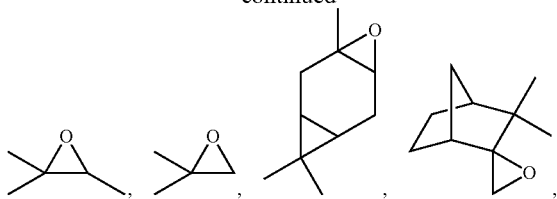

and mixtures thereof.

In another embodiment, the epoxide accelerant is selected from the group consisting of:

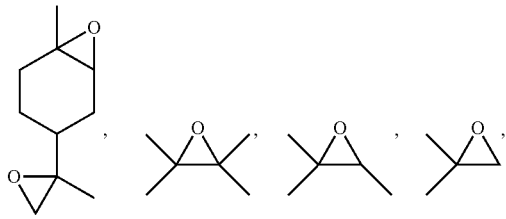

and mixtures thereof.

In another embodiment, the epoxide accelerant is limonene dioxide:

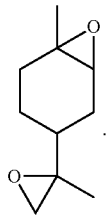

In another embodiment, the epoxide accelerant is a compound of formula (IIa) or a compound of formula (IIb):

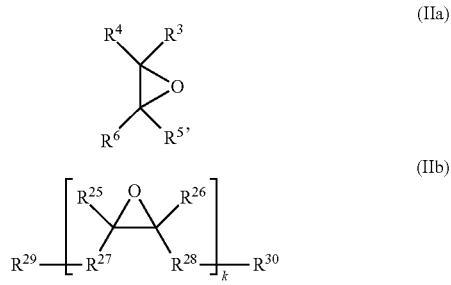

wherein $R^3$ is H, alkyl, alkenyl, alkynyl, carbocycle or heterocycle; wherein $R^3$ is optionally substituted with halogen, hydroxy, oxo, epoxy, carbocycle, heterocycle, or combinations thereof;

$R^4$ is H, alkyl, alkenyl, alkynyl, carbocycle or heterocycle; wherein $R^4$ is optionally substituted with halogen, hydroxy, oxo, epoxy, carbocycle, heterocycle, or combinations thereof;

$R^5$ is H, alkyl, alkenyl, alkynyl, carbocycle or heterocycle; wherein $R^5$ is optionally substituted with halogen, hydroxy, oxo, epoxy, carbocycle, heterocycle, or combinations thereof;

$R^6$ is H, alkyl, alkenyl, alkynyl, carbocycle or heterocycle; wherein $R^6$ is optionally substituted with halogen, hydroxy, oxo, epoxy, carbocycle, heterocycle, or combinations thereof;

or $R^3$ and $R^4$ jointly form $R^{10}$;

or $R^5$ and $R^6$ jointly form $R^{11}$;

or $R^4$ and $R^6$ jointly form $R^{12}$;

wherein the epoxide of formula (IIa) is not mono-substituted;

wherein $R^3$, $R^4$, $R^5$, and $R^6$ cannot all be H at the same time;

wherein $R^3$ and $R^5$ cannot both be H at the same time;

wherein $R^{25}$ and $R^{26}$ cannot both be H at the same time;

$R^{10}$ is carbocycle or heterocycle; wherein $R^{10}$ is optionally substituted with alkyl, alkenyl, alkynyl, halogen, hydroxy, hydroxy alkyl, oxo, epoxy, epoxy alkyl, or combinations thereof;

$R^{11}$ is carbocycle or heterocycle; wherein $R^{11}$ is optionally substituted with alkyl, alkenyl, alkynyl, halogen, hydroxy, hydroxy alkyl, oxo, epoxy, epoxy alkyl, or combinations thereof;

$R^{12}$ is carbocycle or heterocycle; wherein $R^{12}$ is optionally substituted with alkyl, alkenyl, alkynyl, halogen, hydroxy, hydroxy alkyl, oxo, epoxy, epoxy alkyl, or combinations thereof;

$R^{25}$ is H or alkyl;

$R^{26}$ is H or alkyl;

$R^{27}$ is alkyl;

$R^{28}$ is alkyl;

$R^{29}$ is H or alkyl;

$R^{30}$ is H or alkyl; and k is an integer from 1 to 1000.

In one embodiment of the process of the invention, an amount of the epoxide accelerant is from about 5% to about 30% by weight. In another embodiment, the amount of the epoxide accelerant is from about 5% to about 20% by weight. In another embodiment, the amount of the epoxide accelerant is from about 5% to about 10% by weight. In another embodiment, the amount of the epoxide accelerant is from about 5% to about 6% by weight.

In one embodiment, the 3,3-disubstituted oxetane is a compound of formula (IIIa), a compound of formula (IIIb), or a compound of formula OHO:

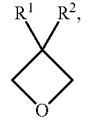

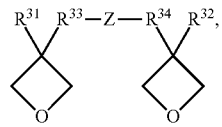

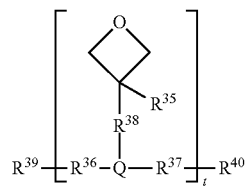

wherein
R¹ is H, alkyl, alkenyl, alkynyl, heteroalkyl, heteroalkenyl, or heteroalkynyl; wherein R¹ is optionally substituted with one or more of halogen, hydroxy, oxo, epoxy, R⁷, or combinations thereof;
R² is H, alkyl, alkenyl, alkynyl, heteroalkyl, heteroalkenyl, or heteroalkynyl; wherein R² is optionally substituted with one or more of halogen, hydroxy, oxo, epoxy, R⁸, or combinations thereof;
wherein R¹ and R² cannot both be H;
or R¹ and R² jointly form R⁹;
R⁷ is carbocycle or heterocycle; wherein R⁷ is optionally substituted with alkyl, alkenyl, alkynyl, halogen, hydroxy, hydroxy alkyl, oxo, epoxy, epoxy alkyl, or combinations thereof;
R⁸ is carbocycle or heterocycle; wherein R⁸ is optionally substituted with alkyl, alkenyl, alkynyl, halogen, hydroxy, hydroxy alkyl, oxo, epoxy, epoxy alkyl, or combinations thereof;
R⁹ is carbocycle or heterocycle; wherein R⁹ is optionally substituted with alkyl, alkenyl, alkynyl, halogen, hydroxy, hydroxy alkyl, oxo, epoxy, epoxy alkyl, or combinations thereof;
R³¹ is alkyl, alkenyl, alkynyl, heteroalkyl, heteroalkenyl, or heteroalkynyl; wherein R¹ is optionally substituted with one or more of halogen, hydroxy, oxo, epoxy, R⁷, or combinations thereof;
R³² is alkyl, alkenyl, alkynyl, heteroalkyl, heteroalkenyl, or heteroalkynyl; wherein R¹ is optionally substituted with one or more of halogen, hydroxy, oxo, epoxy, R⁷, or combinations thereof;
R³³ is alkyl or heteroalkyl; wherein R³³ is optionally substituted with one or more of halogen, hydroxy, oxo, or combinations thereof;
R³⁴ is alkyl or heteroalkyl; wherein R³⁴ is optionally substituted with one or more of halogen, hydroxy, oxo, or combinations thereof;
Z is

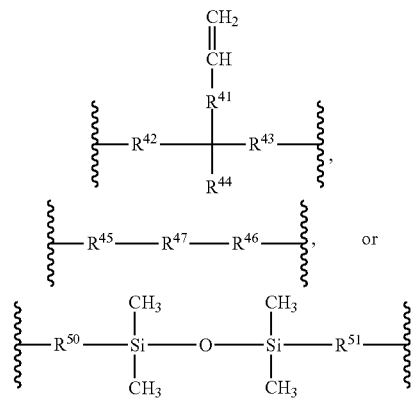

R³⁵ is alkyl;
R³⁶ is direct bond or alkyl;
R³⁷ is direct bond or alkyl;
R³⁸ is alkyl or heteroalkyl;
R³⁹ is H or alkyl;
R⁴⁰ is H or alkyl;
Q is cyclyl or heterocyclyl;
t is an integer from 1 to 1000;
R⁴¹ is direct bond or alkyl;
R⁴² is direct bond, hetero atom, or alkyl;

R⁴³ is direct bond, hetero atom, or alkyl;
R⁴⁴ is H or alkyl;
R⁴⁵ is direct bond, hetero atom, or alkyl;
R⁴⁶ is direct bond, hetero atom, or alkyl;
R⁴⁷ is hetero atom, cyclyl, heterocyclyl, -cyclyl-alkyl-cyclyl-, or -heterocyclyl-alkyl-heterocyclyl-;
R⁵⁰ is direct bond or alkyl; and
R⁵¹ is direct bond or alkyl.

In another embodiment, the 3,3-disubstituted oxetane is selected from the group consisting of:

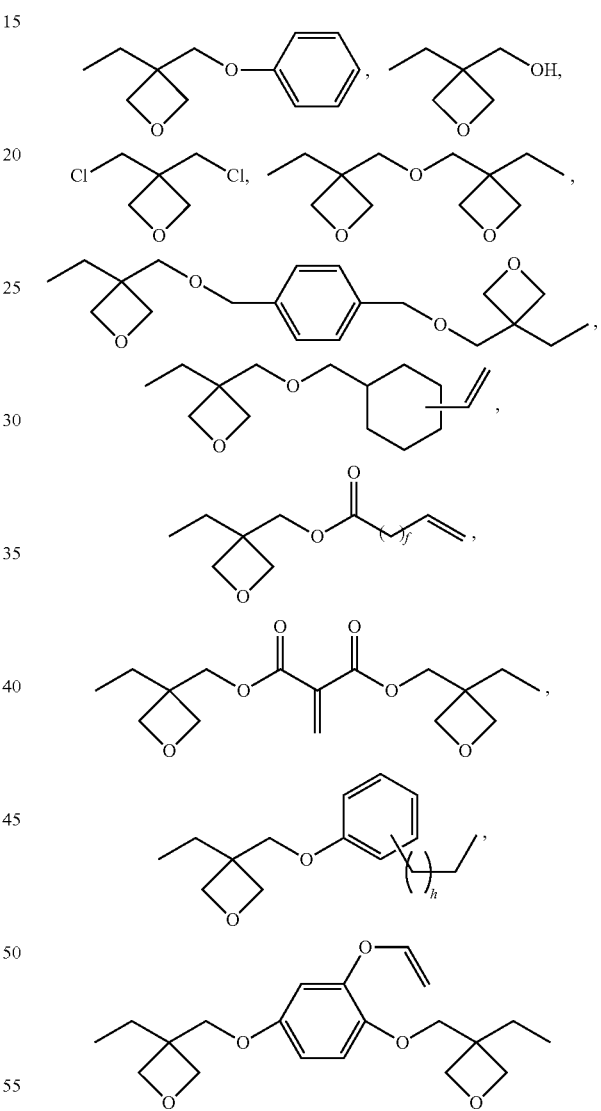

and mixtures thereof,
wherein
f is an integer from 1 to 1000; and
h is an integer from 1 to 1000.

In another embodiment, the 3,3-disubstituted oxetane is an oxetane-functional poly(dimethylsiloxane) oligomer. The oxetane-functional poly(dimethylsiloxane) oligomer may be, for example, a compound of formula (IV):

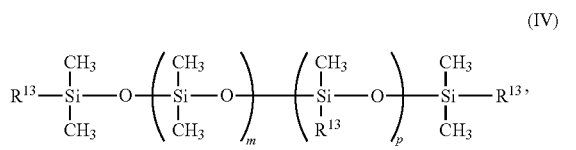

(IV)

wherein
m is an integer from 1 to 1000;
p is an integer from 1 to 1000;
$R^{13}$ is a compound of formula (Va) or a compound of formula (Vb):

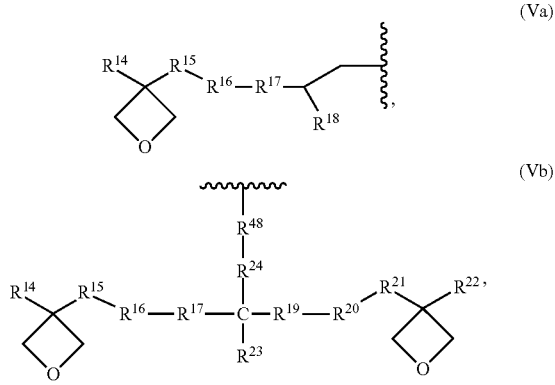

wherein
$R^{14}$ is alkyl;
$R^{15}$ is alkyl;
$R^{16}$ is a direct bond or a hetero atom;
$R^{17}$ is a direct bond, alkyl, cyclyl, carbonyl, or -alkyl-cyclyl-;
$R^{18}$ is H or alkyl;
$R^{19}$ is a direct bond, alkyl, cyclyl, carbonyl, or -alkyl-cyclyl-;
$R^{20}$ is a direct bond or a hetero atom;
$R^{21}$ is alkyl;
$R^{22}$ is alkyl;
$R^{23}$ is H or alkyl;
$R^{24}$ is direct bond or alkyl; and
$R^{48}$ is alkyl.

19. The process of claim 18, wherein:
$R^{13}$ is a compound of formula (Vb), wherein:
$R^{14}$ is methyl, ethyl, or isopropyl;
$R^{15}$ is methyl;
$R^{16}$ is O;
$R^{17}$ is a direct bond, alkyl, cyclyl, carbonyl, or -alkyl-cyclyl-;
$R^{19}$ is a direct bond, alkyl, cyclyl, carbonyl, or -alkyl-cyclyl-;
$R^{20}$ is O;
$R^{21}$ is methyl;
$R^{22}$ is methyl, ethyl, or isopropyl;
$R^{23}$ is H; and
$R^{24}$ is methyl or ethyl.

In one embodiment, the oxetane polymer is a compound of formula (Ia):

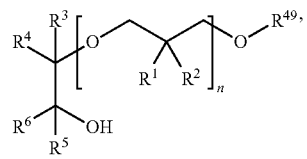

(Ia)

wherein
$R^1$ is H, alkyl, alkenyl, alkynyl, heteroalkyl, heteroalkenyl, or heteroalkynyl; wherein $R^1$ is optionally substituted with one or more of halogen, hydroxy, oxo, epoxy, $R^7$, or combinations thereof;
$R^2$ is H, alkyl, alkenyl, alkynyl, heteroalkyl, heteroalkenyl, or heteroalkynyl; wherein $R^2$ is optionally substituted with one or more of halogen, hydroxy, oxo, epoxy, $R^8$, or combinations thereof;
wherein $R^1$ and $R^2$ cannot both be H;
or $R^1$ and $R^2$ jointly form $R^9$;
$R^3$ is H, alkyl, alkenyl, alkynyl, carbocycle or heterocycle; wherein $R^3$ is optionally substituted with halogen, hydroxy, oxo, epoxy, carbocycle, heterocycle, or combinations thereof;
$R^4$ is H, alkyl, alkenyl, alkynyl, carbocycle or heterocycle; wherein $R^4$ is optionally substituted with halogen, hydroxy, oxo, epoxy, carbocycle, heterocycle, or combinations thereof;
$R^5$ is H, alkyl, alkenyl, alkynyl, carbocycle or heterocycle; wherein $R^5$ is optionally substituted with halogen, hydroxy, oxo, epoxy, carbocycle, heterocycle, or combinations thereof;
$R^6$ is H, alkyl, alkenyl, alkynyl, carbocycle or heterocycle; wherein $R^6$ is optionally substituted with halogen, hydroxy, oxo, epoxy, carbocycle, heterocycle, or combinations thereof;
or $R^3$ and $R^4$ jointly form $R^{10}$;
or $R^5$ and $R^6$ jointly form $R^{11}$;
or $R^4$ and $R^6$ jointly form $R^{12}$;
wherein $R^3$, $R^4$, $R^5$, and $R^6$ cannot all be H at the same time;
wherein any three of $R^3$, $R^4$, $R^5$, and $R^6$ cannot be H at the same time;
wherein both $R^3$ and $R^5$ cannot be H at the same time;
$R^7$ is carbocycle or heterocycle; wherein $R^7$ is optionally substituted with alkyl, alkenyl, alkynyl, halogen, hydroxy, hydroxy alkyl, oxo, epoxy, epoxy alkyl, or combinations thereof;
$R^8$ is carbocycle or heterocycle; wherein $R^8$ is optionally substituted with alkyl, alkenyl, alkynyl, halogen, hydroxy, hydroxy alkyl, oxo, epoxy, epoxy alkyl, or combinations thereof;
$R^9$ is carbocycle or heterocycle; wherein $R^9$ is optionally substituted with alkyl, alkenyl, alkynyl, halogen, hydroxy, hydroxy alkyl, oxo, epoxy, epoxy alkyl, or combinations thereof;
$R^{10}$ is carbocycle or heterocycle; wherein $R^{10}$ is optionally substituted with alkyl, alkenyl, alkynyl, halogen, hydroxy, hydroxy alkyl, oxo, epoxy, epoxy alkyl, or combinations thereof;
$R^{11}$ is carbocycle or heterocycle; wherein $R^{11}$ is optionally substituted with alkyl, alkenyl, alkynyl, halogen, hydroxy, hydroxy alkyl, oxo, epoxy, epoxy alkyl, or combinations thereof;
$R^{12}$ is carbocycle or heterocycle; wherein $R^{12}$ is optionally substituted with alkyl, alkenyl, alkynyl, halogen, hydroxy, hydroxy alkyl, oxo, epoxy, epoxy alkyl, or combinations thereof;

$R^{49}$ is H or alkyl; and
n is an integer from 1 to 50;
the epoxide accelerant is a compound of formula (IIa):

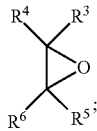

wherein $R^3$, $R^4$, $R^5$, and $R^6$ are as defined above;
and the 3,3-disubstituted oxetane is a compound of formula (IIIa):

wherein $R^1$ and $R^2$ are as defined above.

To arrive at this oxetane polymer compound, the polymerization reaction is terminated with water or alcohol. When the polymerization reaction is terminated with water, $R^{49}$ is H. When the polymerization reaction is terminated with alcohol, $R^{49}$ is alkyl.

In one embodiment, the oxetane polymer is a compound of formula (Ib):

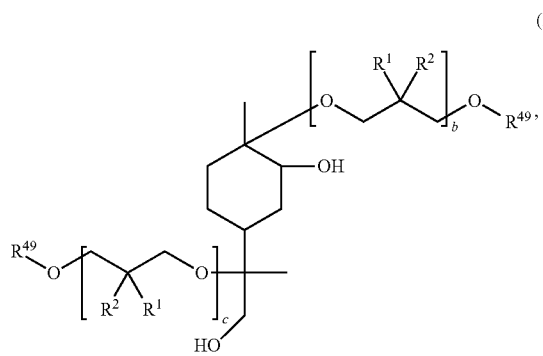

wherein
$R^1$ is H, alkyl, alkenyl, alkynyl, heteroalkyl, heteroalkenyl, or heteroalkynyl; wherein $R^1$ is optionally substituted with one or more of halogen, hydroxy, oxo, epoxy, $R^7$, or combinations thereof;
$R^2$ is H, alkyl, alkenyl, alkynyl, heteroalkyl, heteroalkenyl, or heteroalkynyl; wherein $R^2$ is optionally substituted with one or more of halogen, hydroxy, oxo, epoxy, $R^8$, or combinations thereof;
wherein $R^1$ and $R^2$ cannot both be H;
or $R^1$ and $R^2$ jointly form $R^9$;
$R^9$ is carbocycle or heterocycle; wherein $R^9$ is optionally substituted with alkyl, alkenyl, alkynyl, halogen, hydroxy, hydroxy alkyl, oxo, epoxy, epoxy alkyl, or combinations thereof;
$R^{49}$ is H or alkyl;
b is an integer from 1 to 50; and
c is an integer from 1 to 50;

the epoxide accelerant is limonene dioxide:

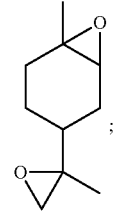

and the 3,3-disubstituted oxetane is a compound of formula (IIIa):

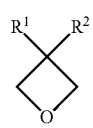

wherein $R^1$ and $R^2$ are as defined above.

To arrive at this oxetane polymer compound, the polymerization reaction is terminated with water or alcohol. When the polymerization reaction is terminated with water, $R^{49}$ is H. When the polymerization reaction is terminated with alcohol, $R^{49}$ is alkyl.

The present invention also encompasses any oxetane polymers prepared by any of the disclosed herein processes. For example, in one embodiment, the invention is directed to an oxetane polymer prepared by a process comprising reacting an epoxide accelerant with one or more (or two or more) equivalents of a 3-monosubstituted oxetane or a 3,3-disubstituted oxetane, wherein the epoxide accelerant is selected from the group consisting of 2,2-substituted epoxide, 2,2,3-substituted epoxide, 2,2,3,3-substituted epoxide, and mixtures thereof.

This written description uses examples to disclose embodiments of the invention, including the best mode, and also to enable any person skilled in the art to practice the invention, including making and using any devices or systems and performing any incorporated methods. The patentable scope of the invention is not limited to the scope of the provided examples, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

EXAMPLES

Materials 1,2,8,9-Limonene dioxide, 1,2-limonene oxide, and α-pinene oxide (mixtures of isomers) were provided as samples by Arkema, Inc., Grand Rapids, Mich., and purified by fractional vacuum distillation before use. 3,3-Bis(chloromethyl)oxetane, isobutylene oxide, (−)-caryophyllene oxide, 2,2,3,3-tetramethyloxirane and other reagents used in this work were obtained from the Aldrich Chemical Company, Milwaukee, Wis. 3-Carene and camphene were kindly provided as a samples from the S. H. Kelkar & Co. LTD, Bombay, India. 2,3-Epoxy-2-methybutane was purchased from Acros Organics, Waltham, Mass. 3,4-Epoxycyclohexylmethyl 3',4'-cyclohexylcarboxylate (ERL-4221E, abbreviated ERL) was purchased from the Union Carbide Corporation (now Dow Chemical Corp., Midland, Mich.). 3-Ethyl-3-phenoxymethyloxetane (POX), 3-ethyl-3-hydroxymethyloxetane (EHMO), bis{[(1-ethyl(3-oxetanyl)] methyl} ether (DOX), and 1,4-bis[(3-ethyl-3-oxetanylmethoxy)methyl]benzene (XDO) were gratefully received as gifts from the Toagosei Chemical Company, Nagoya, Japan. DOX was purified prior to use by fractional vacuum distillation (b.p. 117-118/0.6 mm Hg). Unless otherwise noted, all other reagents, monomers and photoinitiators were used as received without further purification. A sample of Irgacure 651 was kindly supplied by the Ciba Specialty Products Corp., Basel, Switzerland. The diaryliodonium salt (Crivello, J. V.; Lee, J. L. J. Polym. Sci., Part A: Polym. Chem. 1989, 27, 3951-3968) and triarylsulfonium (Akhtar, S. R.; Crivello, J. V.; Lee, J. L. J. Org. Chem. 1990, 55, 4222-4225) salt photoinitiators were prepared as described previously. In this work, three of these photoinitiators were employed and we have developed shorthand designations for these compounds. For example, IOC-1 $SbF_6$ refers to (4-methoxyphenyl)phenyliodonium hexafluoroantimonate, having the structure shown below in which a methoxy group is attached to one of the phenyl groups in the 4-position, while $SbF_6$ denotes the hexafluoroantimonate anion. In a similar manner, IOC-1 $PF_6$ refers to (4-methoxyphenyl)phenyliodonium hexafluorophosphate and SOC-10 $SbF_6$ refers to S(4-n-dodecyloxyphenyl)-S,S-diphenylsulfonium hexafluoroantimonate with the structures indicated below.

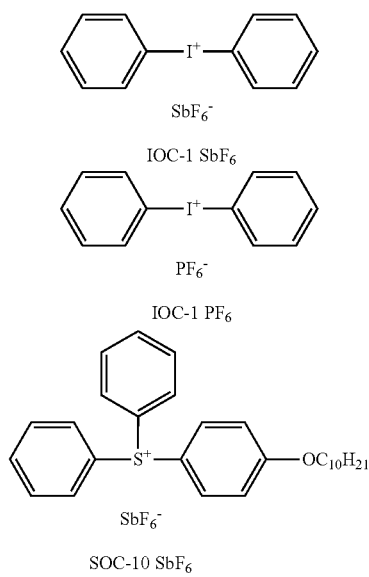

IOC-1 $SbF_6$

IOC-1 $PF_6$

SOC-10 $SbF_6$

Preparation of Terpene Epoxides

The procedure employed for the epoxidiation of the terpenes described in herein was adapted from that published by Fieser and Fieser (Fieser, L. F.; Fieser, M. Reagents for Organic Synthesis, Vol 1, John Wiley and Sons, New York, 1967, pp. 135-139.). 3-Chloroperoxybenzoic acid (MCPBA) was purified by washing the commercially supplied compound with a pH 7.5 buffer potassium hydrogen phosphate buffer followed by drying in vaccuo (Puskas, J. E.; Wilds, C. Rubber Chem. Technol. 1994, 67, 329-341). This affords 99% pure MCPBA. The epoxidation of 3-carene is exemplary of the general method employed in this work. There were placed in a 500 ml three necked flask equipped with a magnetic stirrer, reflux condenser and a thermometer, 13.6 g (0.1 mol) of 3-carene and 120 ml dichloromethane. The reaction vessel was placed in an ice-water bath and 19.5 g (0.113 mol) MCPBA dissolved in 120 ml dichloromethane was added to the reaction vessel via a dropping funnel maintaining the temperature at or below 25° C. When the addition was complete, stirring was continued for 20-30 minutes at 25° C. During reaction 3-chlorobenzoic acid was observed to precipitate. The excess peracid was destroyed by the addition of 100 ml of 10% sodium sulfite and then 200 ml 5% sodium bicarbonate solution was added to neutralize the 3-chlorobenzoic acid. The reaction mixture was transferred to a separatory funnel and the layers were separated and the lower organic layer washed with an additional 100 ml 5% sodium bicarbonate solution. This was followed by washing with 100 ml deionized water. The solvent was removed on a rotary evaporator and 14.1 g of a colorless pleasant smelling liquid product were obtained. 3-Carene oxide (a mixture of cis and trans isomers) was purified by fractional vacuum distillation (b.p. 67° C./3.30 mm Hg; lit. (Settine, R. L.; McDaniel, C. J. Org. Chem. 1967, 32(9), 2910-2912) b.p. 52-52° C./0.3 mm Hg).

The same procedure was applied to the epoxidation of camphene. The yield of crude liquid product was 13.95 g. The impure product was subjected to fractional vacuum distillation and the product boiling at 69° C./0.23 mm Hg was collected. Pure camphene oxide had a tendency to crystallize during distillation and on standing and this corresponds to the behavior of this compound as reported in the literature (Hickenbottom, W. J.; Wood, D. G. M. J. Chem. Soc. 1953, 1906-1908) (m.p. 86-88° C.).

(−)-Caryophyllene oxide was purchased from the Sigma-Aldrich Chemical Co. and purified by recrystallization from methanol prior to use (lit. (Sowa, C. E.; Eggert, U.; Hoffman, H. M. R. Tetrahedr. 1993, 49(20), 4183-4192) b.p. 262-264° C./760 mm Hg).

Optical Pyrometry Characterization of Oxetane-Epoxide Photopolymerizations

We have previously described the analytical techniques and apparatus used in this laboratory for optical pyrometry (OP) (Falk, B.; Vallinas, S. M; Crivello, J. V. J. Polym. Sci., Part A: Polym. Chem. 2003, 41(4), 579-596; Falk, B.; Vallinas, S. M; Crivello, J. V. Polym. Mat. Sci. Eng. Prepr. 2003, 89, 279-280). Samples for OP kinetic analysis were prepared by sandwiching a liquid oxetane monomers and mixtures of oxetane and epoxide monomers containing the designated photoinitiator between two thin (12.5 mm) films of fluorinated poly(ethylene-co-propylene) (DuPont FEP thermoplastic film) using an open polyester mesh as a spacer. The samples were mounted in plastic 2 cm×2 cm slide frames and then inserted into the sample holder for analysis. The average thickness of the samples was 0.912 mm. Irradiation with UV light was accomplished using a UVEXS Model SCU-110 mercury arc lamp (Sunnyvale, Calif.) equipped with a liquid optic cable. The liquid optic cable served as a light filter passing UV light of wavelengths greater than 300 nm, but blocks both shorter wavelengths as well as longer wavelengths in the infrared region. UV irradiation intensities were measured using a Control Cure Radiometer (UV Process Supply, Chicago, Ill.). Several kinetic runs were performed for each photopolymerizable system and the results reported in this article were the average of at least three kinetic runs. Typically, the reproducibility of the kinetic data was ±5%. All kinetic studies were conducted at ambient laboratory temperature (25-28° C.) unless otherwise noted. All monomer concentrations unless otherwise noted are given in moles while the photoinitiator concentrations are given in weight %.

FT-IR Spectroscopy

Fourier Transform infrared (FT-IR) spectra were recorded on a Nicolet 4700 FT-IR spectrometer. The spectra of various liquid reagents, starting materials and the synthesized oligomers were obtained using samples prepared by sandwiching between two KBr plates. Mixtures of the epoxy functional oligomers with dissolved photoinitiators were spread as thin films on a KBr salt plate and covered with a thin film of fluorinated poly(ethylene-propylene) copolymer. The samples were subsequently irradiated through the polymer film for 3 minutes using a UVEXS Model SCU-110 mercury arc lamp (Sunnyvale, Calif.) equipped with a liquid optic cable. The measured light intensity was 2200 mJ cm$^{-2}$ min$^{-1}$. Thereafter, the polymer film was removed and the FT-IR spectra recorded.

Photosensitized Polymerizations

Irradiation of the 4:1 molar POX:LDO samples in the above described optical pyrometer apparatus was carried out using a UVEX Model SCU-110 spot cure mercury arc lamp equipped with a liquid optic cable. The light beam was passed through a 25 mm dia. Melles-Grigot (Zevenaan, Neth.) MG 03FCG457 glass band pass filter to limit the UV irradiation of the sample to only wavelengths longer than 400 nm. The light intensity used in these experiments was 24 mJ cm$^{-2}$ min$^{-1}$.

Thin Film Photopolymerization Studies

These photopolymerizations were carried out on a Fusion Systems Model MC 6R microwave-activated 300 W electrodeless lamp system equipped with a UV D bulb mounted above a variable speed conveyor. Exposure intensities were measured using a Control Cure Radiometer, UV Process Supply, Chicago, Ill. Line speeds were calculated using a stopwatch. The length of the conveyor belt was 120 cm. Uniform 1 mil (25 mm) liquid monomer-photoinitiator films were coated onto steel Q-panels using a drawknife and transferred to the conveyor for curing. Tack-free times were determined by immediately testing the films for tackiness on exiting from the UV cure zone. The UV cured samples were colorless, glossy and hard.

While only certain features of the invention have been illustrated and described herein, many modifications and changes will occur to those skilled in the art. It is, therefore, to be understood that the appended claims are intended to cover all such modifications and changes as falling within the true spirit of the invention.

Some additional details of the present inventions may be found in my following recent publications: Crivello, Journal of Polymer Science, Part A: Polymer Chemistry, 2015, 53, 586-593; Crivello, Macromol. Symp., 2013, 323, 75-85; Crivello, Nuclear Instruments and Methods in Physics Research B, 1999, 151, 8-21; Crivello, Journal of Polymer Science, Part A: Polymer Chemistry, 2015, 53, 594-601; Crivello, Polymer, 2015, 64, 227-233; Crivello, Journal of Polymer Science, Part A: Polymer Chemistry, 2014, 52, 2934-2946.

Throughout this application, various chemical reaction mechanisms are discussed. The inventions described herein are not intended to be limited by these chemical reaction mechanisms.

Throughout this application, various references are referred to. The disclosures of these publications in their entireties are hereby incorporated by reference as if written herein.

What is claimed is:

1. A process for preparation of an oxetane polymer, the process comprising photopolymerizing an epoxide accelerant with one or more equivalents of a 3,3-disubstituted oxetane, wherein the oxetane polymer is a compound of formula (Ia):

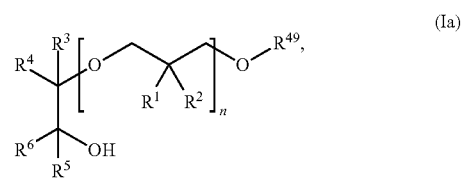

wherein $R^1$ is H, alkyl, alkenyl, alkynyl, heteroalkyl, heteroalkenyl, or heteroalkynyl; wherein $R^1$ is optionally substituted with one or more of halogen, hydroxy, oxo, epoxy, $R^7$, or combinations thereof;

$R^2$ is H, alkyl, alkenyl, alkynyl, heteroalkyl, heteroalkenyl, or heteroalkynyl; wherein $R^2$ is optionally substituted with one or more of halogen, hydroxy, oxo, epoxy, $R^8$, or combinations thereof;

wherein $R^1$ and $R^2$ cannot both be H;

or $R^1$ and $R^2$ jointly form $R^9$;

$R^3$ is alkyl, alkenyl, alkynyl, carbocycle or heterocycle; wherein $R^3$ is optionally substituted with halogen, hydroxy, oxo, epoxy, carbocycle, heterocycle, or combinations thereof;

$R^4$ is alkyl, alkenyl, alkynyl, carbocycle or heterocycle; wherein $R^4$ is optionally substituted with halogen, hydroxy, oxo, epoxy, carbocycle, heterocycle, or combinations thereof;

$R^5$ is alkyl, alkenyl, alkynyl, carbocycle or heterocycle; wherein $R^5$ is optionally substituted with halogen, hydroxy, oxo, epoxy, carbocycle, heterocycle, or combinations thereof;

$R^6$ is H;

or $R^3$ and $R^4$ jointly form $R^{10}$;

wherein $R^3$, $R^4$, $R^5$, and $R^6$ cannot all be H at the same time;

wherein any three of $R^3$, $R^4$, $R^5$, and $R^6$ cannot be H at the same time;

wherein both $R^3$ and $R^5$ cannot be H at the same time;

$R^7$ is carbocycle or heterocycle; wherein $R^7$ is optionally substituted with alkyl, alkenyl, alkynyl, halogen, hydroxy, hydroxy alkyl, oxo, epoxy, epoxy alkyl, or combinations thereof;

$R^8$ is carbocycle or heterocycle; wherein $R^8$ is optionally substituted with alkyl, alkenyl, alkynyl, halogen, hydroxy, hydroxy alkyl, oxo, epoxy, epoxy alkyl, or combinations thereof;

$R^9$ is carbocycle or heterocycle; wherein $R^9$ is optionally substituted with alkyl, alkenyl, alkynyl, halogen, hydroxy, hydroxy alkyl, oxo, epoxy, epoxy alkyl, or combinations thereof;

$R^{10}$ is carbocycle or heterocycle; wherein $R^{10}$ is optionally substituted with alkyl, alkenyl, alkynyl, halogen, hydroxy, hydroxy alkyl, oxo, epoxy, epoxy alkyl, or combinations thereof;

$R^{49}$ is H or alkyl; and n is an integer from 1 to 50;

the epoxide accelerant is a compound of formula (IIa):

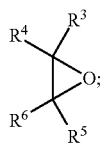

(IIa)

wherein $R^3$, $R^4$, $R^5$, and $R^6$ are as defined above;

and the 3,3-disubstituted oxetane is a compound of formula (IIIa):

(IIIa)

wherein $R^1$ and $R^2$ are as defined above.

2. The process of claim 1, wherein the epoxide accelerant does not include limonene 1,2-oxide:

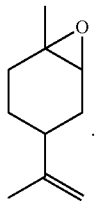

3. The process of claim 1, wherein the epoxide accelerant does not include alpha-pinene oxide:

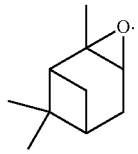

4. The process of claim 1, wherein an amount of the epoxide accelerant is from about 5% to about 30% by weight.

5. The process of claim 1, wherein an amount of the epoxide accelerant is from about 5% to about 20% by weight.

6. The process of claim 1, wherein an amount of the epoxide accelerant is from about 5% to about 10% by weight.

7. The process of claim 1, wherein an amount of the epoxide accelerant is from about 5% to about 6% by weight.

8. An oxetane polymer obtained according to the process of claim 1.

* * * * *